United States Patent
Seibold et al.

(10) Patent No.: US 11,964,595 B2
(45) Date of Patent: Apr. 23, 2024

(54) SEAT TILTING SYSTEM

(71) Applicant: ADIENT ENGINEERING AND IP GMBH, Burscheid (DE)

(72) Inventors: Kurt A. Seibold, Farmington Hills, MI (US); Michael John Kapusky, South Lyon, MI (US); Eric Bernard Michalak, Canton, MI (US)

(73) Assignee: Adient US LLC, Plymouth, MI (US)

( * ) Notice: Subject to any disclaimer, the term of this patent is extended or adjusted under 35 U.S.C. 154(b) by 637 days.

(21) Appl. No.: 16/972,046

(22) PCT Filed: Jun. 4, 2019

(86) PCT No.: PCT/EP2019/064473
§ 371 (c)(1),
(2) Date: Dec. 4, 2020

(87) PCT Pub. No.: WO2019/234014
PCT Pub. Date: Dec. 12, 2019

(65) Prior Publication Data
US 2021/0170921 A1     Jun. 10, 2021

Related U.S. Application Data

(60) Provisional application No. 62/681,113, filed on Jun. 6, 2018.

(51) Int. Cl.
*B60N 2/10*     (2006.01)
*B60N 2/14*     (2006.01)
(Continued)

(52) U.S. Cl.
CPC ............... *B60N 2/143* (2013.01); *B60N 2/10* (2013.01); *B60N 2002/022* (2013.01);
(Continued)

(58) Field of Classification Search
CPC .......... B60N 2/143; B60N 2/10; B60N 2/146; B60N 2/2869; B60N 2/39; B60N 2002/022; B60N 2/14
See application file for complete search history.

(56) References Cited

U.S. PATENT DOCUMENTS 4,846,529 A * 7/1989 Tulley ............... B60N 2/02246
                                                    297/DIG. 10
6,059,253 A * 5/2000 Koutsky ............... B60N 2/527
                                                    248/550
(Continued)

FOREIGN PATENT DOCUMENTS

| CN | 103357187 A | 10/2013 |
| CN | 107264365 A | 10/2017 |

(Continued)

OTHER PUBLICATIONS

China National Intellectual Property Administration, Office Action in Application No. 201980037726.3, dated Dec. 21, 2022, 11 pages.
(Continued)

*Primary Examiner* — Amy R Weisberg
*Assistant Examiner* — Sara Laghlam
(74) *Attorney, Agent, or Firm* — Marshall & Melhorn, LLC

(57) ABSTRACT

A seat tilting system for tilting a seat, in particular a vehicle seat, may have at least a seat support structure to support and mount the seat, a base platform defining a reference plane, and a number of swivel actuators coupling the seat support structure relative to the base platform. At least a first swivel actuator is configured to swivel the seat support structure with respect to the base platform around a first swivel axis. At least a second swivel actuator is configured to swivel the seat support structure with respect to the base platform around a second swivel axis. At least a third swivel actuator (Continued)

is configured to rotate the seat support structure around a third swivel axis perpendicular to the base platform.

22 Claims, 21 Drawing Sheets

(51) Int. Cl.
  *B60N 2/02* (2006.01)
  *B60N 2/28* (2006.01)
  *B60N 2/39* (2006.01)
(52) U.S. Cl.
  CPC ............ *B60N 2/146* (2013.01); *B60N 2/2869* (2013.01); *B60N 2/39* (2013.01)

(56) References Cited

U.S. PATENT DOCUMENTS

| | | | | |
|---|---|---|---|---|
| 9,120,410 | B2* | 9/2015 | Bauman | ................. B60N 2/522 |
| 9,707,874 | B2 | 7/2017 | Bauman | |
| 10,131,254 | B2 | 11/2018 | Bauman | |
| 10,286,824 | B2* | 5/2019 | Boland | .................... B60N 2/62 |
| 11,110,829 | B2* | 9/2021 | Garotte | .............. B60N 2/42727 |
| 2014/0263933 | A1* | 9/2014 | Bauman | ................. B63B 29/00 |
| | | | | 248/636 |
| 2020/0339019 | A1* | 10/2020 | Marktscheffel | .......... B60N 2/70 |

FOREIGN PATENT DOCUMENTS

| | | | |
|---|---|---|---|
| CN | 109999517 A | * 7/2019 | |
| DE | 4423957 A1 | 1/1996 | |
| DE | 202006007283 U1 | * 10/2007 | ........... B60N 2/2252 |
| DE | 102018009665 B3 | * 2/2020 | ................ B60N 2/02 |
| GB | 2214234 A | 8/1989 | |
| GB | 2313214 A | * 11/1997 | ............... B60N 2/39 |
| GB | 2313214 A | 11/1997 | |
| JP | 2000104706 A | 4/2000 | |
| JP | 2007333120 A | 12/2007 | |

OTHER PUBLICATIONS

The State Intellectual Property Office of People's Republic of China, Office Action in Application No. CN 201980037726.3, 9 pages.

European Patent Office, International Search Report with Written Opinion, issued in PCT/EP2019/064473, dated Jul. 25, 2019, 9 pages, European Patent Office, Rijswijk, Netherlands.

* cited by examiner

SEAT TILTING SYSTEM

BACKGROUND OF THE INVENTION

The present invention relates to a seat tilting system for tilting a seat, in particular a vehicle seat. The present invention further relates to a seat and a vehicle having a seat.

A vehicle seat usually is adjustable to adapt the position and/or ergonomic configuration of the seat to the needs of an occupant of the seat.

SUMMARY OF THE PRESENT INVENTION

It is an object of the present invention to provide an improved seat tilting system for adapting the position of a seat in order to enhance the comfort of the seat.

The object is achieved by a seat tilting system according to claim 1, by a seat according to claim 12 and by a vehicle according to claim 13.

According to the invention, a seat tilting system comprises at least a seat support structure to support and mount the seat, a base platform defining a reference plane, and a number of swivel actuators coupling the seat support structure relative to the base platform, wherein at least a first swivel actuator is configured to swivel the seat support structure with respect to the base platform around a first swivel axis, at least a second swivel actuator is configured to swivel the seat support structure with respect to the base platform around a second swivel axis, and at least a third swivel actuator is configured to rotate the seat support structure around a third swivel axis perpendicular to the reference plane.

The seat tilting system according to the invention makes the orientation of a seat adjustable in order to make the seat more comfortable for an occupant of the seat. In particular the seat tilting system allows to adapt the orientation of a vehicle seat of a vehicle to driving maneuvers of the vehicle such as quick turns of the vehicle, for instance to center an occupant in the seat. In addition the seat tilting system may be used for easier ingress to or egress from the vehicle, and allows an occupant to get to a comfortable position to relax. Furthermore, the seat tilting system is configured to enhance functions of the seat in autonomous vehicles that combines a swivel function with other degrees of freedom to ease ingress or egress and additionally to assist in centering an occupant's G-forces.

Furthermore, the seat tilting system is configured to benefit mobility-challenged persons, for instance elderly and larger-sized individuals. To this end the seat tilting system comprises at least three swivel actuators to realize a yaw, pitch and roll motion of the seat. In particular, the seat is a pedestal seat.

Moreover, this seat tilting system is configured as a universal joint allowing motion of the seat via rotation joints. This enables the seat to be constructed with core products, such as recliners, and enables smooth motion of the seat.

In an exemplary embodiment, the swivel actuators are arranged below the seat support structure. This arrangement enables the swivel actuators to adjust the seat support structure in any combination of a number of degrees of freedom including yaw, pitch and roll with respect to the base platform.

According to another embodiment, the seat tilting system is controllable by using unique controls, such as a joy stick and/or a space ball. Additionally or optionally, controlling of the seat tilting system can be automated to keep the occupant firmly in the seat while driving.

According to an embodiment, each swivel actuator comprises a recliner mechanism that may be configured as a rotary recliner or a ratchet recliner. In particular, the recliner mechanism is configured as a wobble drive mechanism arranged in a corresponding swivel axis. Additionally or optionally, each swivel actuator may comprise at least one of a pivot bearing, a pivot fitting and/or an electric-powered adjustable fitting.

According to another embodiment, each swivel actuator is arranged and configured to adjust the seat support structure in any combination of a number of degrees of freedom including yaw, pitch and roll. For instance, each swivel actuator is independently and/or simultaneously adjustable and lockable in any position. Therefore, each swivel actuator is manually or power-driven adjustable. For example, one of the swivel actuators is a roll swivel actuator. Another one of the swivel actuators is a pitch swivel actuator. Further, another one of the swivel actuators is a yaw swivel actuator.

According to a further possible embodiment, the first swivel actuator is substantially rigidly mounted to the seat support structure. For instance, the second swivel actuator is substantially rigidly mounted to the base platform. In particular, the third swivel actuator is coupled to the base platform. The seat tilting system provides a yaw, pitch and roll motion in one pedestal.

The yaw motion rotates the entire seat structure, whereas the seat is lockable in any direction, e.g. in the autonomous vehicle environment for comfort, conversation, ingress or egress. The roll motion swivel the entire seat structure laterally below an occupant's H-point (hip point) as an additional motion for comfort, conversation, ingress or egress and/or any activity in an autonomous vehicle environment. The pitch motion swivel the entire seat structure below the occupant's H-point and acts as recline function where the occupant can be more upright or more reclined.

In another possible embodiment, at least the first swivel actuator is pivotably coupled to the second swivel actuator such that the first swivel actuator moves with respect to the base platform when the second swivel actuator is actuated. A mounting space can be reduced, whereas the first and second swivel actuators interacts with each other in such a manner that two different swivel axes are provided to the seat by one shared center point of the swivel axes. That means that the swivel actuators can be arranged as close as possible to each other.

According to an embodiment, at least the first and the second swivel actuators are coupled to each other via an adaptor. In particular, the adaptor is cube-shaped, trapezoidal, rectangular or ring-shaped. In particular, two first swivel actuators and two second swivel actuators are pairwise mounted on opposite sides of the adaptor. Thereby, each swivel force around one swivel axis is compensated by two actuators. Further, a weight force of the occupant is compensated and balanced. Moreover, each swivel actuator can be spring-loaded.

According to another embodiment, the swivel actuators are arranged to each other in such manners that their swivel axis meet in a center point of the base platform. The center point, particularly pivot/swivel point, is arranged below and as close to the H-point as a mounting space underneath the seat allows without affecting a comfort of the seat. All three motions, i.e. yaw, pitch and roll can be released simultaneously or individually.

According to a further possible embodiment, the seat support structure comprises at least a cushion structure which is manually or power-driven adjustable to follow an occupant's thigh angle, wherein the cushion structure is lockable in any angled position. According to a further embodiment, a front of the seat, in particular of a cushion of the seat, is tiltable and/or flexible independently of swivel motions of the seat to follow a thigh angle of the occupant. Alternatively or additionally, an entire cushion of the seat is tiltable. For instance, a pivot point is arranged below the seat and slightly forward of the occupant's H-point in a location where the occupant can easily shift the cushion angle with his/her weight.

In a further embodiment, the cushion structure is made of a substantially flexible material. For instance, the cushion structure comprises foam material and/or is made of any flexible material so a front portion of the cushion can flex with the front tilt motion of the cushion structure.

Further, the invention describes a seat, in particular vehicle seat, having a seat tilting system according to the description above.

Furthermore, the invention describes a vehicle having such a seat and a seat tilting system for tilting the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, wherein.

Corresponding parts are marked with the same reference symbols in all figures.

DETAILED DESCRIPTION OF PREFERRED EMBODIMENTS

Figure 1:
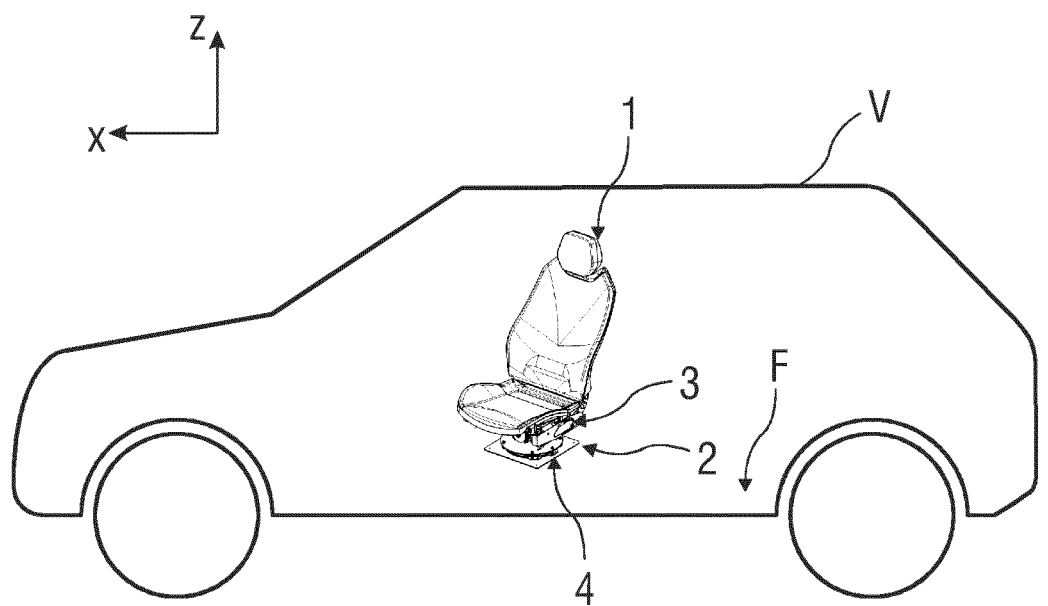
FIG. 1 shows a sectional of a vehicle having a vehicle seat and a seat tilting system.

FIG. 1 shows schematically a sectional view of a vehicle V having a vehicle seat 1. The seat 1 comprises a seat tilting system 2 for tilting the seat 1 into various positions.

For a better understanding of subsequent descriptions of the seat 1 a coordinate system is shown in further figures. The coordinate system comprises a longitudinal axis x, a transverse axis y and a vertical axis z in relation to the vehicle V.

The seat tilting system 2 comprises a seat support structure 3 to support and mount the seat 1, for instance to the vehicle V. Further, the seat tilting system 2 comprises a base platform 4 which is mounted to a vehicle floor F of the vehicle V. In particular, the seat support structure 3 is coupled relatively to the base platform 4.

Figure 2A:
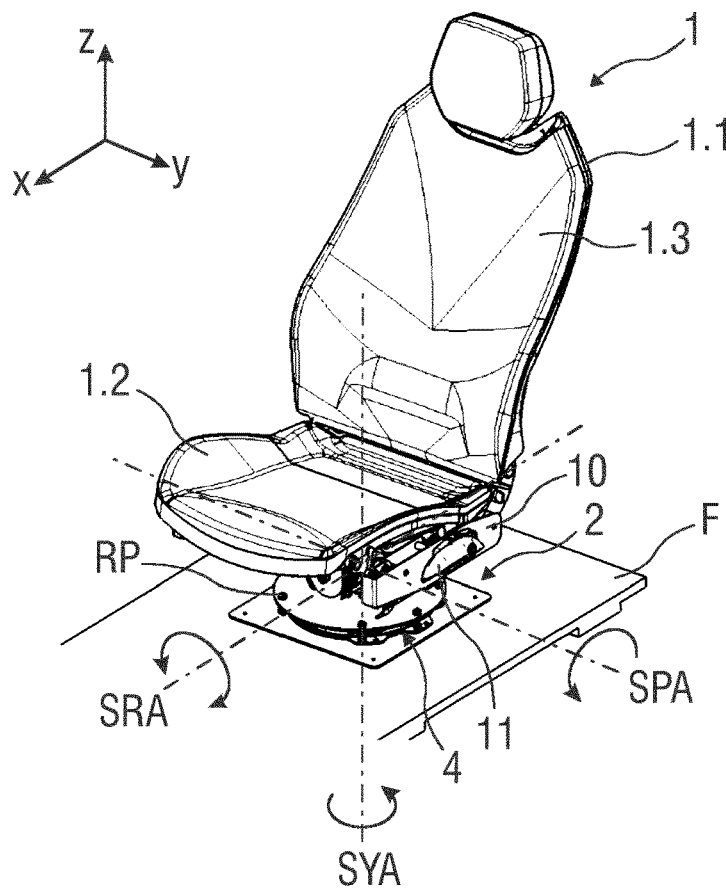
FIGS. 2A and 2B show each a perspective and a rear view of the seat and the seat tilting system with the seat in a first position.
Figure 2B:
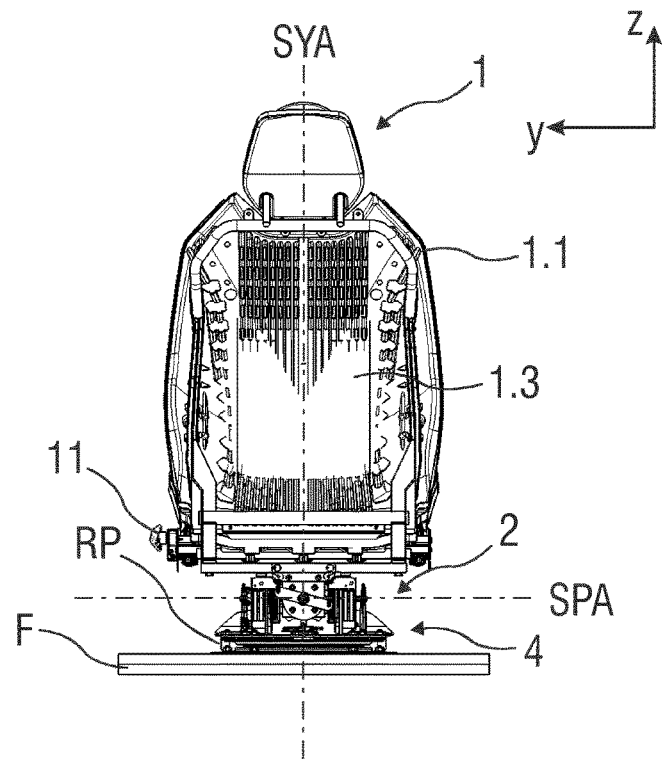

FIGS. 2A and 2B show perspective views of the seat 1 and the seat tilting system 2 with the seat 1 in a first position. In particular, FIG. 2A shows the seat 1 in a perspective view and FIG. 2B shows the seat 1 in a rear view.

For example, the seat 1 comprises a rigid seat structure 1.1, particularly seat frame structure. The seat 1 comprises a seat pan 1.2 and a backrest 1.3. By moving, in particular swiveling/tilting the seat 1, the seat pan 1.2 and the backrest 1.3 are moved together. Therefore, the seat support structure 3 of the seat tilting system 2 is rigidly coupled to the seat pan 1.2. For instance, the seat support structure 3 comprises a number of cross tubes 3.1 shown in FIGS. 3C, 7A to 8A. The cross tubes 3.1 are mounted to a lower side of the seat pan 1.2. Particularly, the lower side is facing towards the base platform 4.

In particular, the seat tilting system 2 is arranged below and mounted to the seat pan 1.2. For instance, the seat 1 is a pedestal seat. The seat tilting system 2 is configured as a universal joint system between the seat 1 and the base platform 4.

The seat tilting system 2 is configured to swivel/tilt the seat 1 around a first swivel axis SRA, in particular a roll axis parallel to the longitudinal axis x of the seat 1. Further, the seat tilting system 2 is configured to swivel/tilt the seat 1 around a second swivel axis SPA, in particular a pitch axis parallel to the transverse axis y of the seat 1. Furthermore, the seat tilting system 2 is configured to rotate the seat 1 around a third swivel axis SYA, in particular a yaw axis parallel to the vertical axis z of the vehicle V.

Particularly, the base platform 4 defines a reference plane RP which is parallel to an XY-plane of the coordinate system, the x-axis runs from a rear side to a front side of the seat 1.

In particular, the seat tilting system 2 for tilting the seat 1, comprising at least the seat support structure 3 to support and mount the seat 1, the base platform 4 defining a reference plane RP, and a number of swivel actuators 5 to 9 (shown inter alia in FIG. 9A) coupling the seat support structure 3 relative to the base platform 4, wherein at least a first swivel actuator 5, 6 is configured to swivel the seat support structure 3 with respect to the base platform 4 around the first swivel axis SRA, at least a second swivel actuator 7, 8 is configured to swivel the seat support structure 3 with respect to the base platform 4 around the second swivel axis SPA, and at least a third swivel actuator 9 is configured to rotate the seat support structure 3 around the third swivel axis SYA which is perpendicular to the base platform 4. The swivel actuators 5 to 9 are described in more detail in the description of FIGS. 9A to 9C.

Figure 3A:
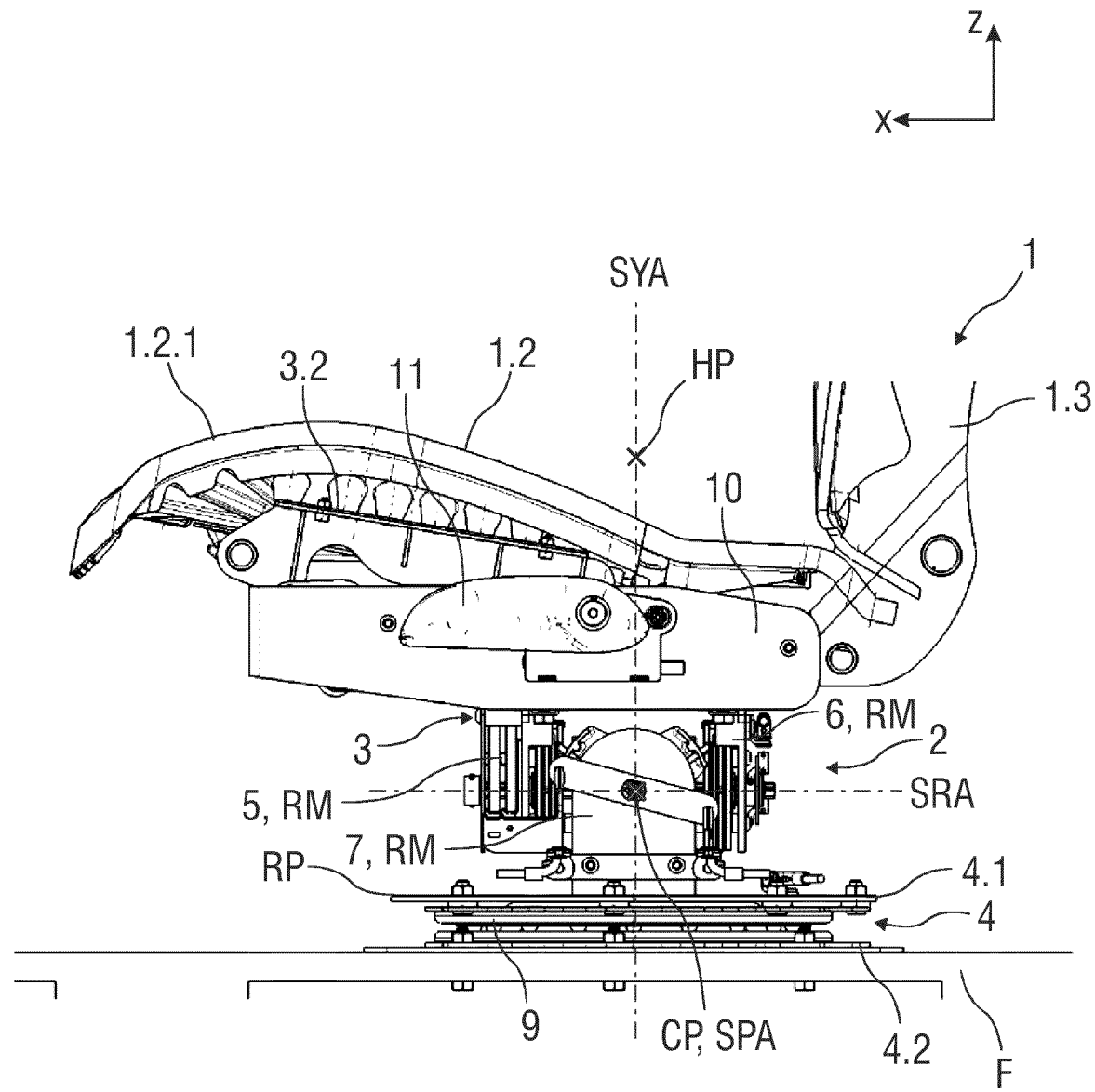
FIGS. 3A to 3C show each a side, perspective and rear view of a section of the seat and the seat tilting system with the seat in the first position.
Figure 3B:
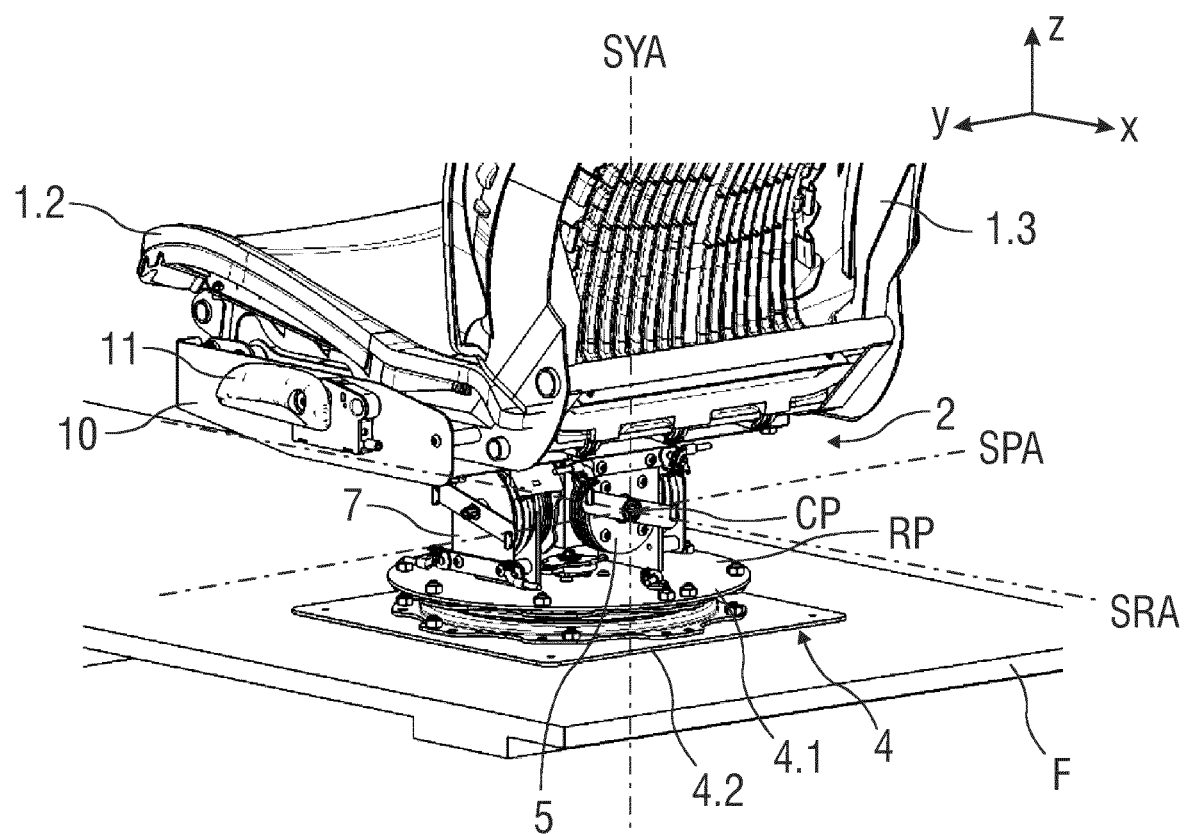
Figure 3C:
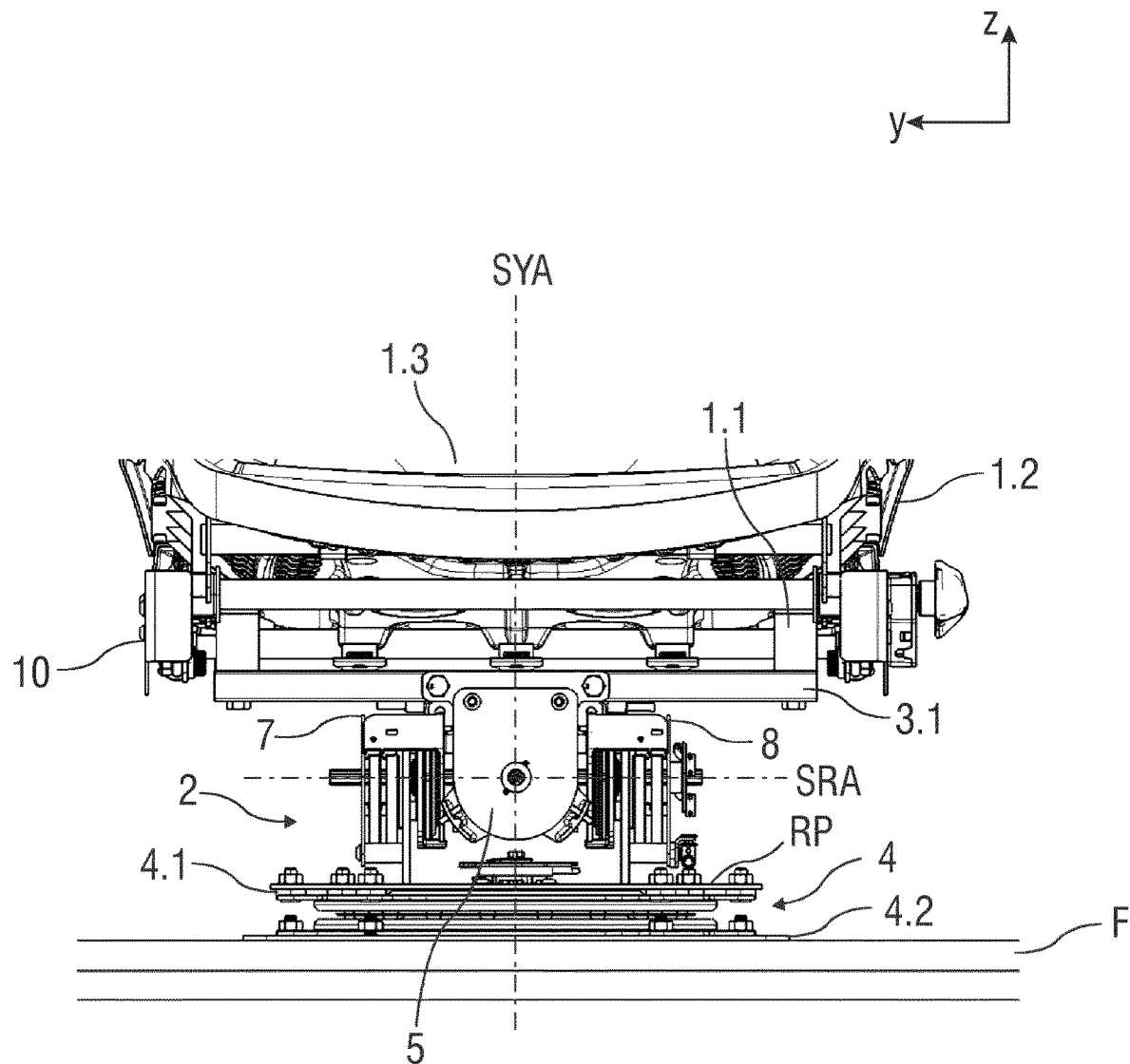

FIG. 3A shows a side view of a section of the seat 1, in particular in a seat pan section, and the seat tilting system 2 with the seat 1 in the first position. FIG. 3B shows a perspective view of the section of the seat 1 and the seat tilting system 2, and FIG. 3C shows a rear view of the section of the seat 1 and the seat tilting system 2.

The seat tilting system 2 comprises a number of swivel actuators 5 to 9 which are arranged below the seat 1. The swivel actuators 5 to 9 are arranged to mount the seat 1 relatively to the base platform 4.

First swivel actuators 5, 6 are configured to swivel the seat support structure 3 with respect to the base platform 4 around the first swivel axis SRA. Second swivel actuators 7, 8 are configured to swivel the seat support structure 3 with respect to the base platform 4 around the second swivel axis SPA, wherein only one of the two second swivel actuators 7, 8 is shown. A third swivel actuator 9 is configured to swivel the seat support structure 3 around the third swivel axis SYA perpendicular to the reference plane RP.

Particularly, the two first swivel actuators 5, 6 and the two second swivel actuators 7, 8 are arranged pairwise opposite to each other. The first swivel actuators 5, 6 are oppositely arranged in a rear and front side of the seat 1. The second swivel actuators 7, 8 are oppositely arranged in lateral sides of the seat 1. The third swivel actuator 9 is arranged below the first and second swivel actuators 5 to 8.

In particular, the seat tilting system 2 is configured to swivel in-line or close to in-line with an H-point HP (hip-point) of a not further shown occupant. That means that the swivel actuators 5 to 9 are arranged in such a manner that their corresponding swivel axis SRA, SPA, SYA meet each other in a center point CP. The center point CP, particularly pivot/swivel point, is arranged below and as close to the H-point HP as a mounting space underneath the seat 1 allows without affecting a comfort of the seat 1. The seat tilting system 2 provides a yaw, pitch and roll motion in one pedestal. Each swivel actuator 5 to 9 is arranged and configured to adjust the seat support structure 3 in any combination of a number of degrees of freedom including yaw, pitch and roll. All three motions can be released simultaneously or individually. Moreover, each of the swivel actuators 5 to 9 is lockable in any position combination of the seat 1. For example, each swivel actuator 5 to 9 is spring-loaded.

The swivel actuators 5 to 9 are each manually or power-driven adjustable. Each of the swivel actuators 5 to 9 comprises at least one of a recliner mechanism RM. For example, the recliner mechanism RM is configured as a rotary recliner or an incrementally adjustable recliner. In particular, the recliner mechanism RM is configured as a wobble drive mechanism arranged in a corresponding swivel axis SRA, SPA, SYA.

According to a further embodiment, the swivel actuators 5 to 9 are each configured as a pivot fitting. Additionally or optionally, the swivel actuators 5 to 9 are each configured as an electric-powered (continuously) adjustable fitting.

The first swivel actuators 5, 6 are substantially rigidly mounted to the seat support structure 3. The second swivel actuators 7, 8 are substantially rigidly mounted to the base platform 4. The third swivel actuator 9 is coupled to the base platform 4. For instance, the base platform 4 is subdivided into an upper platform 4.1 and a lower platform 4.2, whereas the upper platform 4.1 is movably, particularly rotatable, mounted with respect to the lower platform 4.2. The lower platform 4.2 is fixed to the vehicle floor F. The third swivel actuator 9 is arranged between the upper and the lower platform 4.1, 4.2.

For example, the first swivel actuators 5, 6 are pivotable coupled to the second swivel actuators 7, 8 such that the first swivel actuators 5, 6 move, particularly swivel, with respect to the base platform 4 when the second swivel actuators 7, 8 are actuated.

Further, the seat support structure 3 comprises a cushion structure 3.2 which is configured to tilt and/or flex with the thigh angle of the occupant. In particular, the cushion structure 3.2 is adjustable independently from or simultaneously with the yaw, pitch and roll motion of the seat 1. The cushion structure 3.2 is manually or power-driven adjustable. For example, the tiltable and/or flexible cushion structure 3.2 is arranged at a front seat pan side 1.2.1. Particularly, the cushion structure 3.2 is lockable in any angled position. According to another embodiment, the cushion structure 3.2 is configured as a cushion panel 3.3. For instance, the cushion structure 3.2 made of substantially flexible material. In another embodiment, the cushion structure 3.2 is self-acting adjustable following the thigh angle of the occupant, whereas a cushion angle can be shifted by weight pressure.

Furthermore, the seat support structure 3 comprises a cover 10 to cover a side of the seat support structure 3 with respect to lateral sides of the seat pan 1.2. Moreover, an operating and/or releasing and locking lever 11 for the occupant is mounted to the cover side. For instance, the lever 11 is configured to actuate motion of the seat tilting system 2 and/or the cushion structure 3.2

Figure 4A:
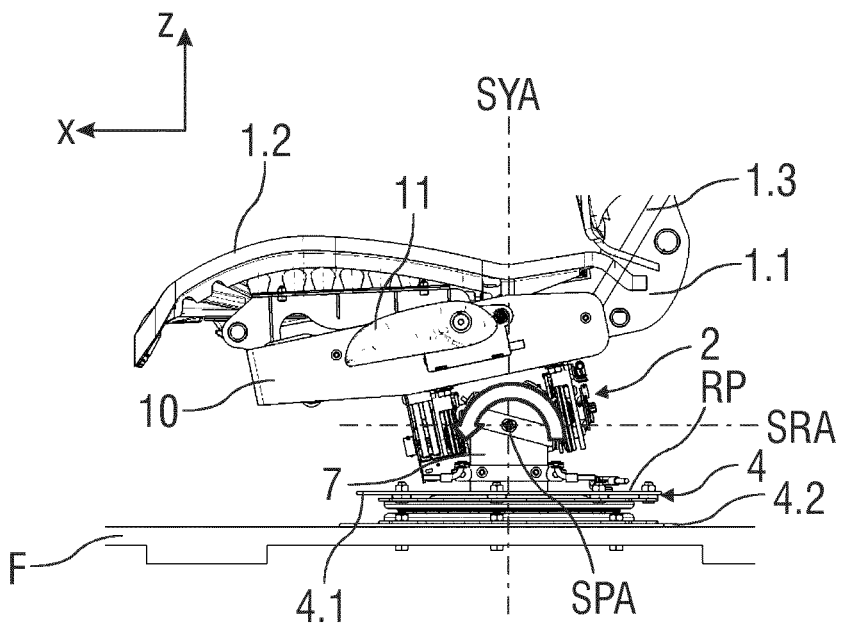
FIGS. 4A and 4B show each a side view of a section of seat and the seat tilting system with the seat in different positions.
Figure 4B:
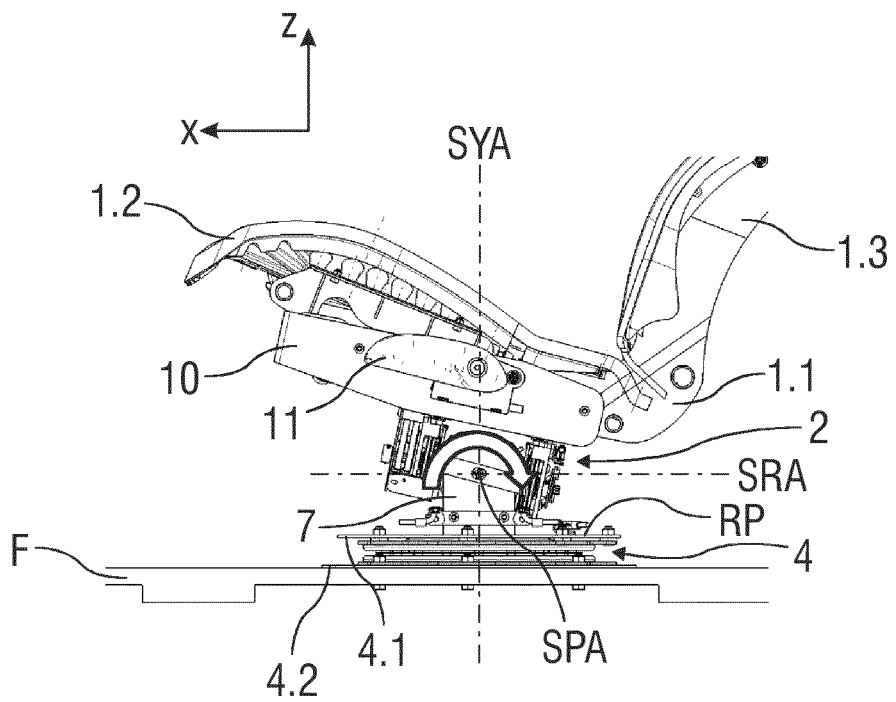

FIGS. 4A and 4B show each a side view of a section of seat 1 and the seat tilting system 2 with the seat 1 in different positions. In particular, the seat 1 is tilted around the second swivel axis SPA, particularly pitch axis, by the second swivel actuators 7, 8. The pitch motion tilts the entire seat structure 1.1 below the occupant's H-point HP and acts as recline function where the occupant can be more upright or more reclined. The front of the seat pan 1.2, particularly the cushion structure 3.2, tilts and/or flexes with the occupant thigh angle to maintain contact and support of the thighs. A front cushion tilt motion also prevents the occupant's legs from being lifted off the vehicle floor F when the seat 1 is at or close to a fully reclined position.

Figure 5A:
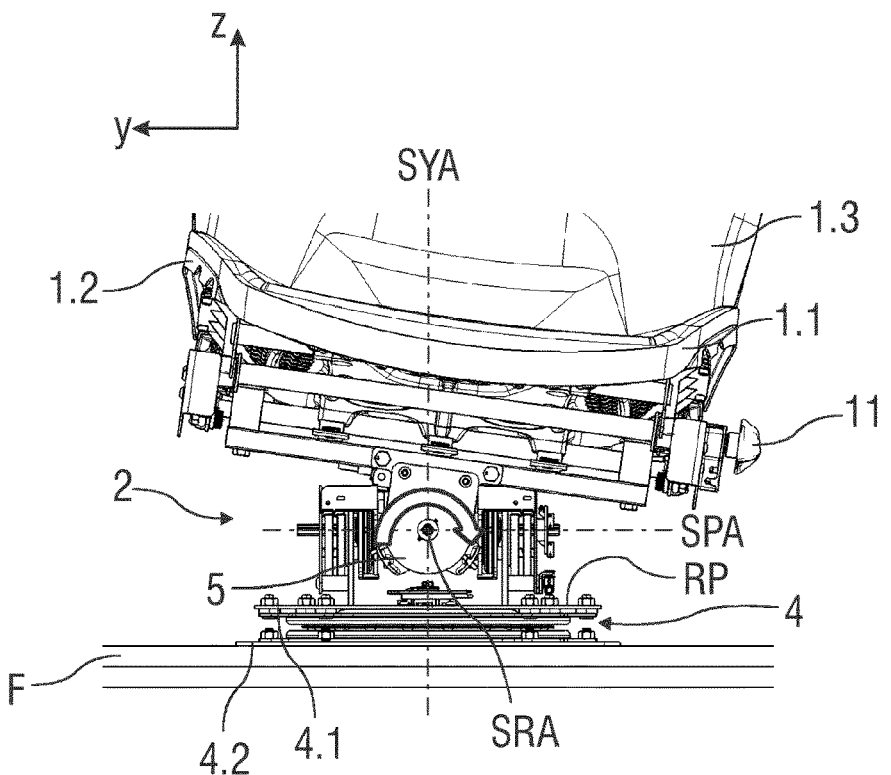
FIGS. 5A and 5B show each a front view of the seat and the seat tilting system with the seat in different positions.
Figure 5B:
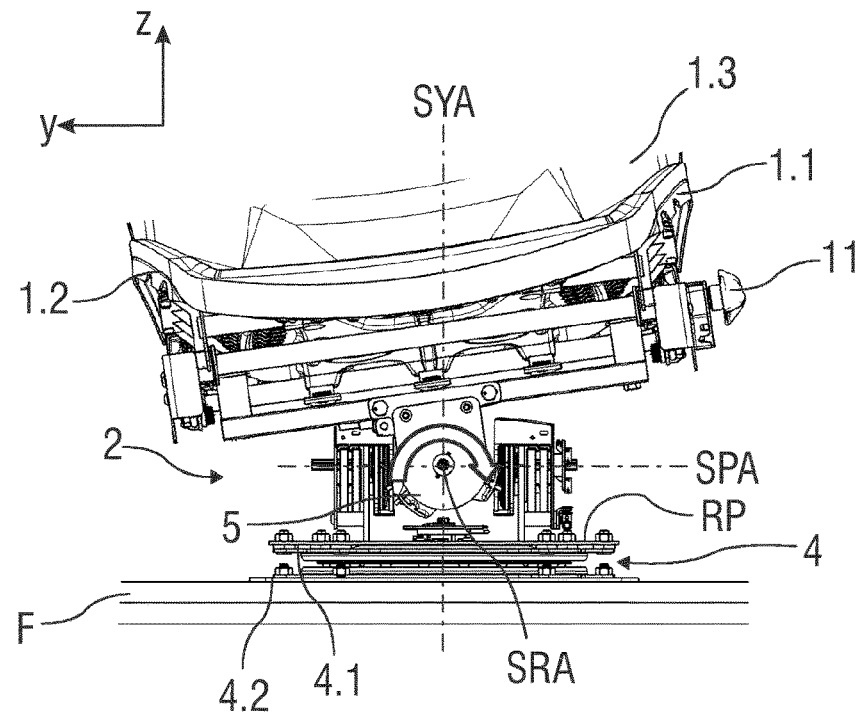

FIGS. 5A and 5B show each a front view of the seat 1 and the seat tilting system 2 with the seat 1 in different positions. In particular, the seat 1 is tilted around the first swivel axis SRA, particularly roll axis, by the first swivel actuators 5, 6. The roll motion tilts the entire seat structure 1.1 laterally below the occupant's H-point HP as an additional motion for comfort, conversation, ingress or egress and/or any activity in an autonomous vehicle environment.

Figure 6A:
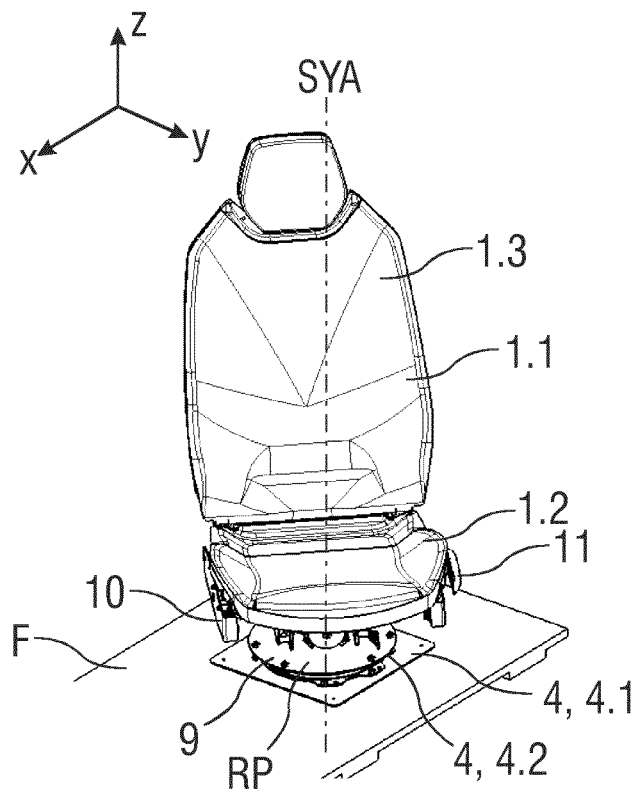
FIGS. 6A to 6C show each a perspective view of the seat and the seat tilting system with the seat in different positions.
Figure 6B:
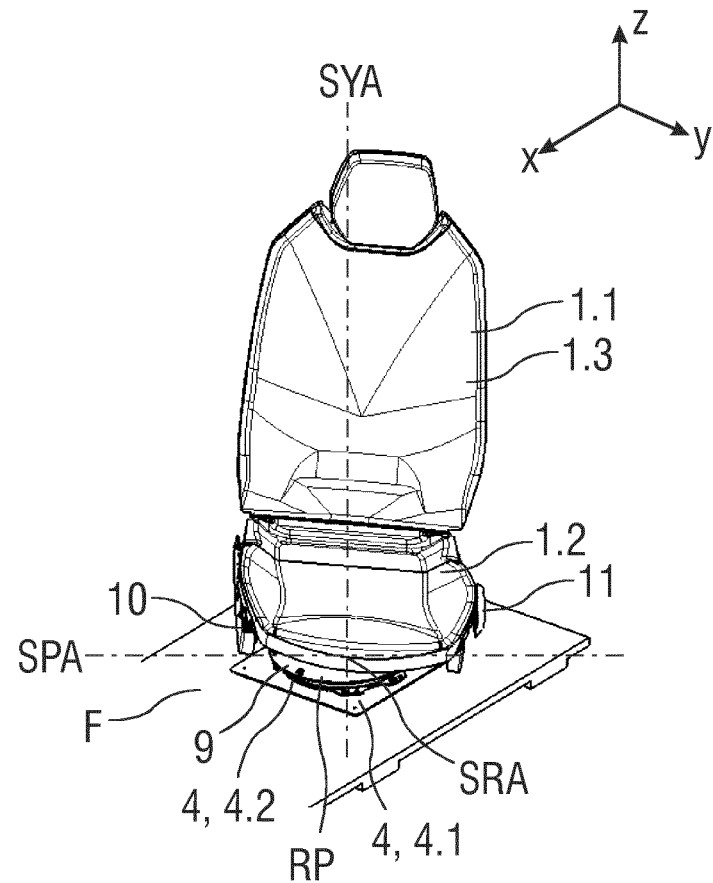
Figure 6C:
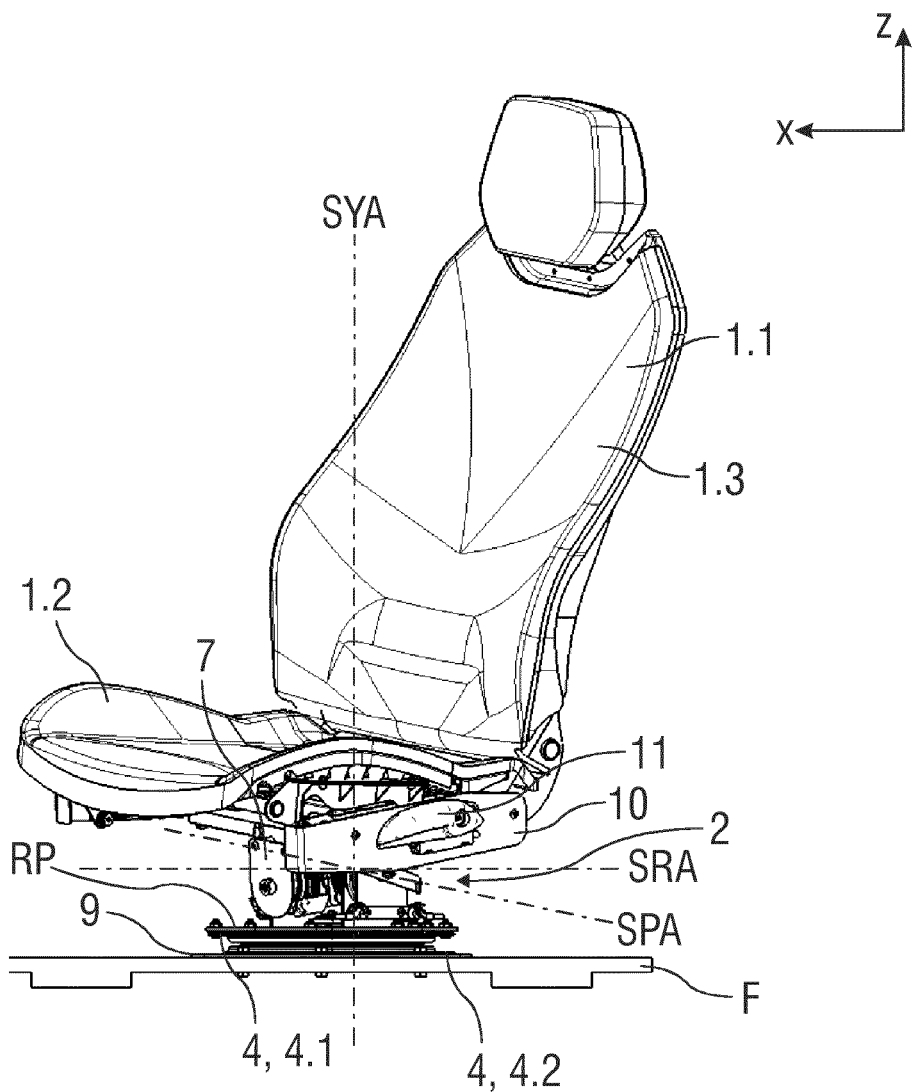

FIGS. 6A to 6C show each a perspective view of the seat 1 and the seat tilting system 2 with the seat 1 in different positions. In particular, FIG. 6A shows the seat 1 rotated around the third swivel axis SYA, particularly yaw axis, by the third swivel actuator 9. The yaw motion rotates the entire seat structure 1.1, whereas the seat 1 is lockable in any direction, e.g. in the autonomous vehicle V environment for comfort, conversation, ingress or egress.

FIGS. 6B and 6C show the seat 1 rotated around the third swivel axis SYA and tilted around the first swivel axis SRA as well as the second swivel axis SPA. The seat 1 can be shifted and locked in any combination of the yaw-pitch-roll motion within travel limits set by each corresponding swivel axis SYA, SPA, SRA. The front cushion flex can also be positioned and locked in any desired position within set travel limits. The shown examples are excerpts of a plurality of possible combined positions and combination of motions that could be used for egress or ingress.

Figure 7A:
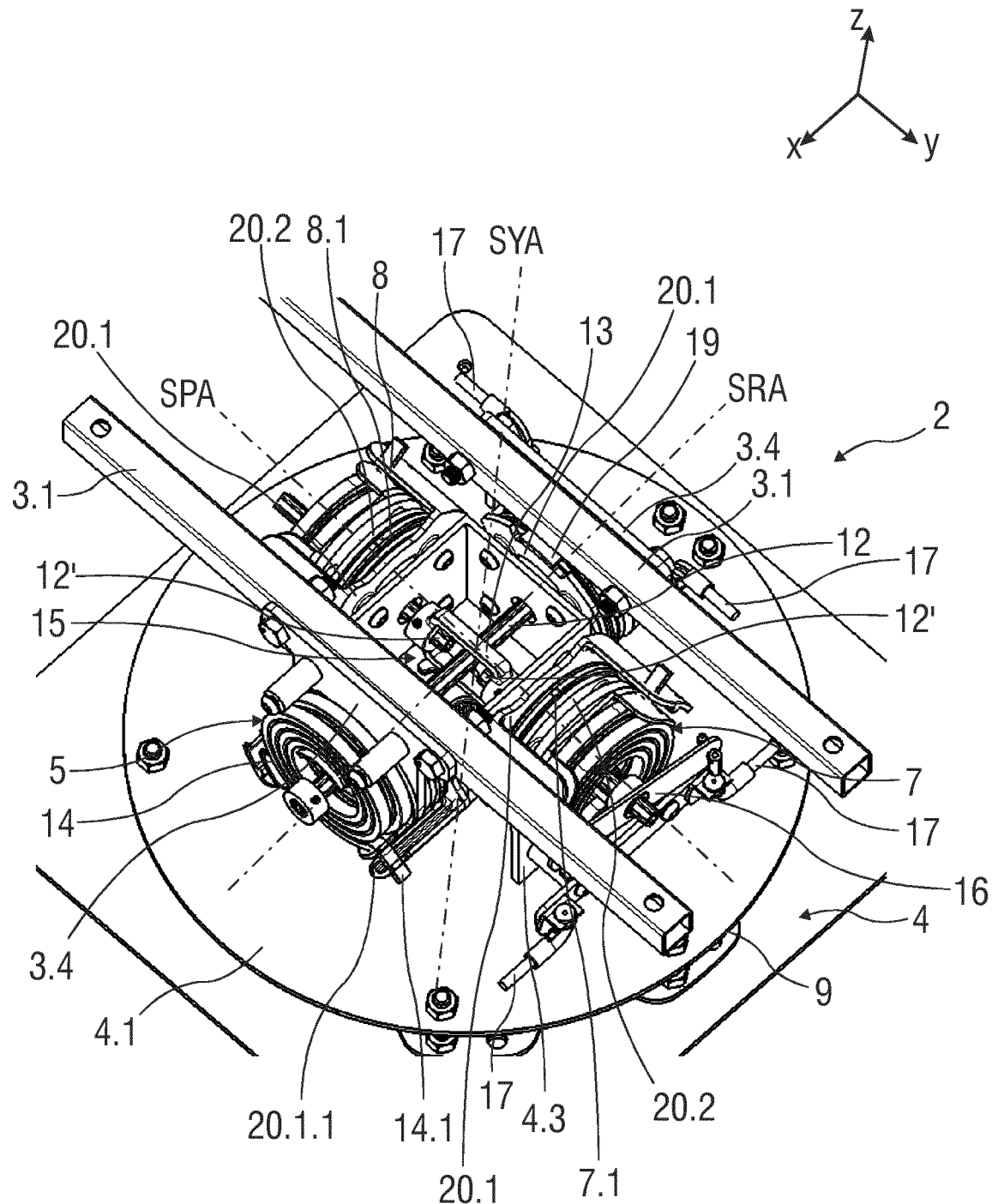
FIGS. 7A to 7C show each a perspective view of an embodiment of the seat tilting system.
Figure 7B:
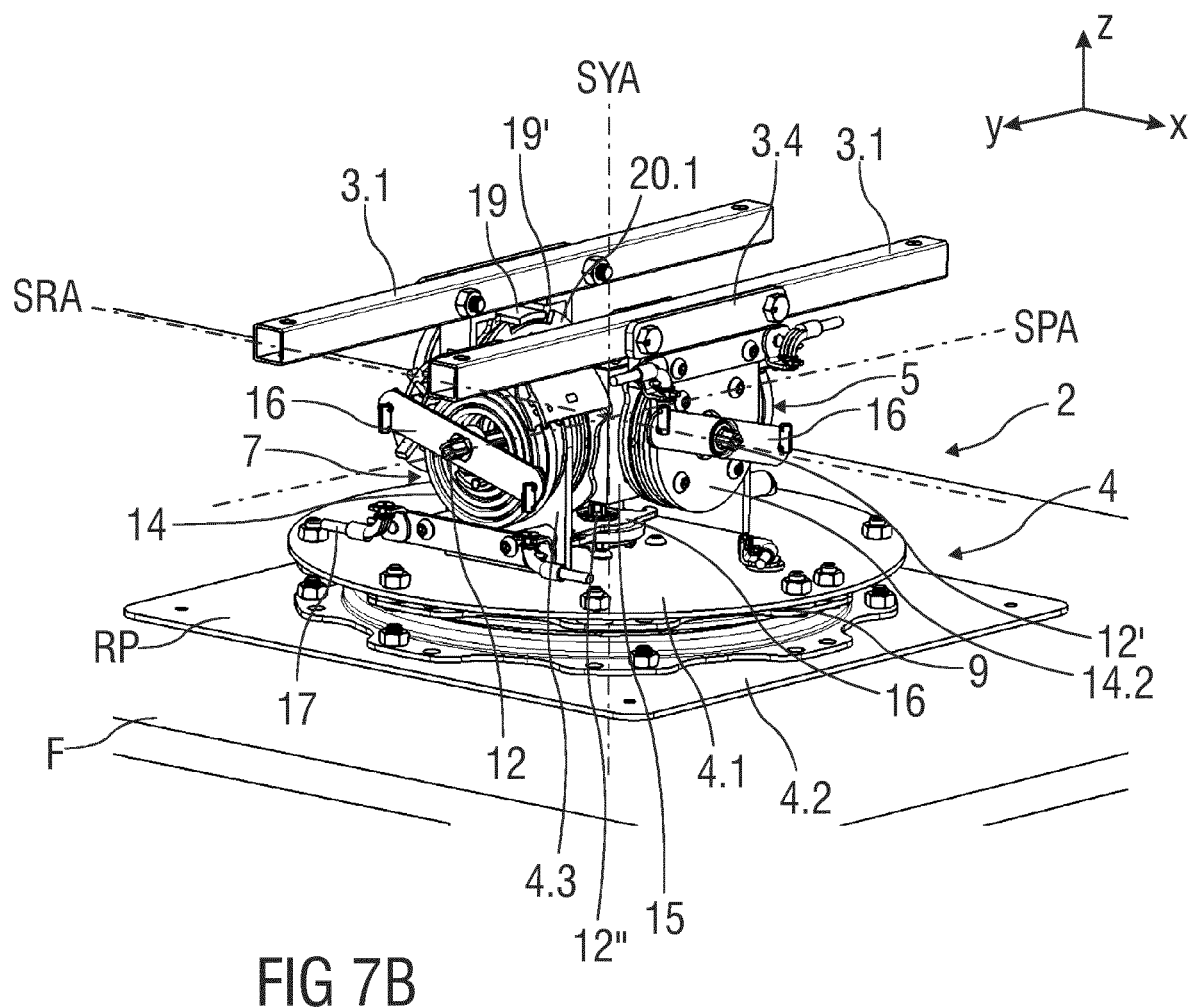
Figure 7C:
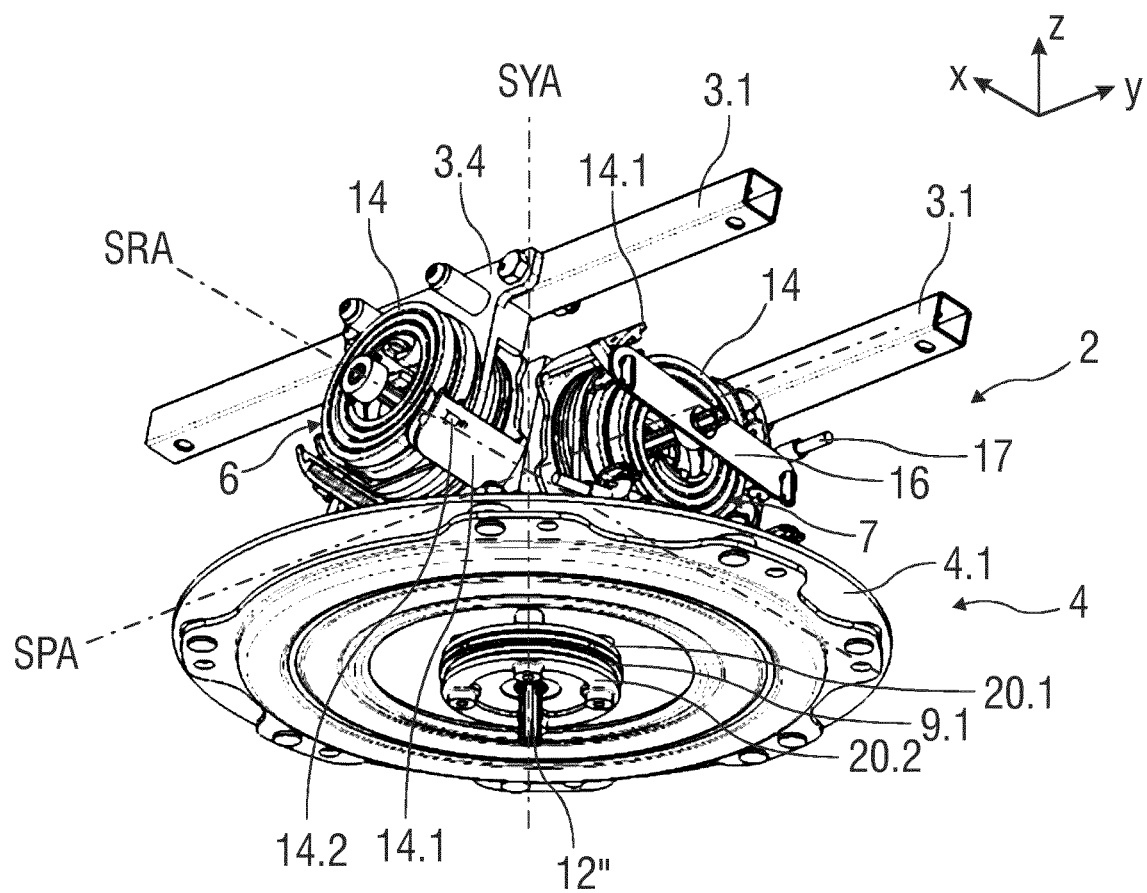

FIGS. 7A to 7C show each a perspective view of an embodiment of the seat tilting system 2. The seat tilting system 2 comprises a first set of manual or powered swivel actuators 5, 6, such as seat recliners, for the roll axis and a second set of manually or power-driven swivel actuators 7, 8, such as seat recliners, for the pitch axis.

FIG. 7A shows that each swivel actuator 5, 6 and 7, 8 is connected with a bar 12, 12', which form drive shafts of the recliner mechanism RM. According to the shown embodiment, the first swivel actuators 5, 6 are connected via a continuous bar 12. The second swivel actuators 7, 8 are each connected to a separate bar 12' whose ends are spaced to each other. With other words: The bar 12' between the second swivel actuators 7, 8 is broken by a gap such that the second swivel actuators 7, 8 are not connected to each other by the bar 12'. In particular, a bar adaptor 13 is arranged between the second swivel actuators 7, 8 in order to connect the bars 12' along the second swivel axis SPA, in particular along the pitch axis. The gap allows corresponding bars 12, 12' to rotate freely and release all four manual or powered swivel actuators 5 to 8. The third swivel actuator 9 is connected with a bar 12" shown in FIG. 7C.

Springs 14 are used to balance pitch and roll motions. For instance, the springs 14 are spiral springs, in particular tension coil springs. According to the shown embodiment, each swivel actuator 5 to 8 comprises two springs 14 in order to meet required loads for the recliner mechanism RM.

The springs 14 are arranged and configured to actuate in both directions on each of the swivel axes SPA, SRA. The springs 14 are configured to bias the swivel actuators 5 to 8 toward center or neutral positions in both, the roll and pitch axis. The roll axis, in particular the third swivel axis SRA, is not spring-loaded.

Figure 9A:
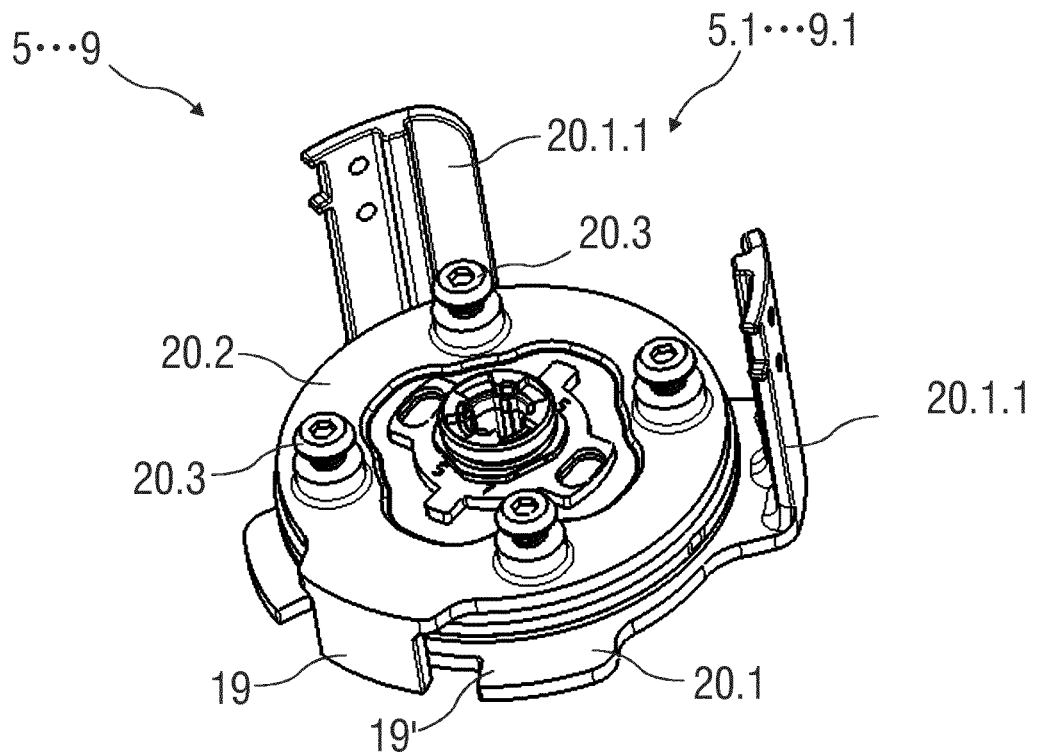
FIGS. 9A to 9C show each a perspective view of an embodiment of a recliner core element of a swivel actuator of the seat tilting system.
Figure 9B:
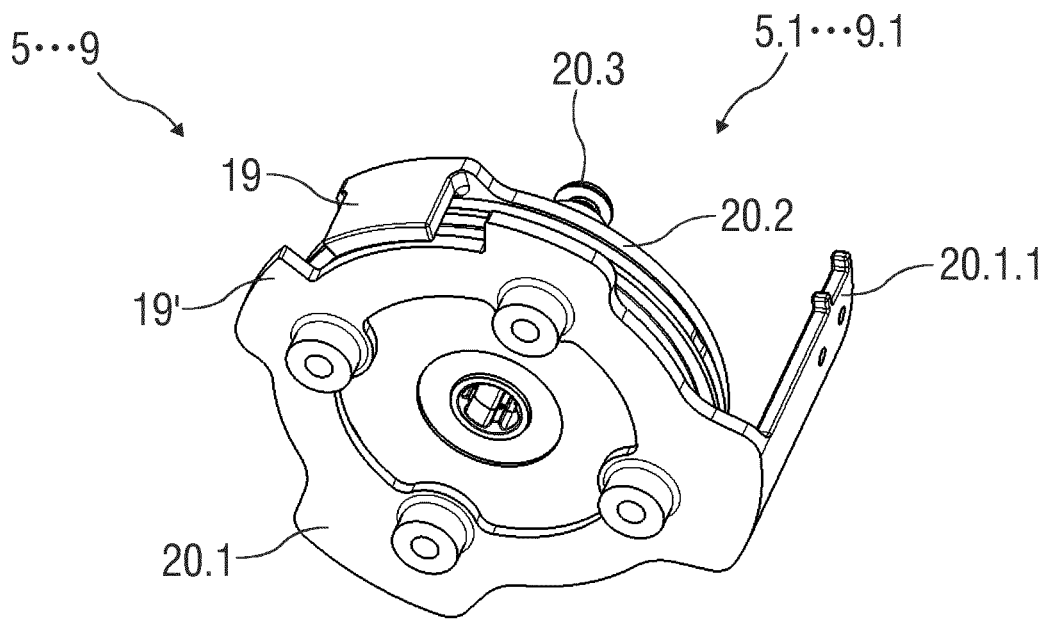

According to the shown embodiment, the springs 14 are each fixed with one end 14.1 to a spring tab 20.1.1 that is a rigid part of an adaptor plate 20.1, 20.2 engaged to a recliner core element 5.1 to 8.1 (see FIGS. 9A to 9C) of a swivel actuator 5 to 8. In particular, the swivel actuators 5 to 8 respectively comprise at least one recliner core element 5.1 to 8.1, two adaptor plates 20.1, 20.2 and one spring 14. Each of the recliner core elements 5.1 to 8.1 are configured as a centerpiece of the swivel actuators 5 to 8 and are respectively arranged between the two adaptor plates 20.1, 20.2 as shown in FIGS. 9A and 9B. Hence, the recliner core elements 5.1 to 8.1 enable mechanical support to the adaptor plates 20.1, 20.2 and the springs 14.

One adaptor plate 20.1 is engaged to a center cube-shaped adaptor 15 that is arranged to connect all four swivel actuators 5 to 8 as shown in FIG. 7A. The two first swivel actuators 5, 6 and the two second swivel actuators 7, 8 are pairwise mounted on opposite sides of the cube-shaped adaptor 15 respectively via their adaptor plates 20.1. The other adaptor plates 20.2 are respectively arranged opposite the adaptor plates 20.1, facing an outside area of the seat 1.

The springs 14 are each engaged to the adaptor plate 20.1, wherein a spring end 14.1 may be flange-like inserted into a gap arranged within a spring tab 20.1.1. The spring tab 20.1.1 protrudes axially from an edge of the adaptor plate 20.1 engaged to the center cube-shaped adaptor 15. In particular, the spring tab 20.1.1 protrudes in a direction away from the center cube-shaped adaptor 15.

Furthermore, the other adaptor plates 20.2 respectively comprise a travel stop 19 protruding axially from an edge of the adaptor plates 20.2 towards the adaptor plate 20.1. The travel stops 19 are configured to engage with corresponding recesses 19' inserted into the edge of the adaptor plate 20.1 in order to limit the movements of the seat 1 via the first and second swivel actuators 5 to 8. Ends of the recesses 19' enable a limitation movement of the travel stop 19 within the recess 19'. FIG. 7A exemplarily shows a travel stop 19 engaged to a recess 19' of the first swivel actuator 6.

The first swivel actuators 5, 6 are further mounted to the cross tubes 3.1 of the seat support structure 3 respectively via a mounting plate 3.4. The mounting plates 3.4 are respectively screwed to the corresponding cross tube 3.1 and protrude towards the base platform 4 though spacing the upper platform 4.1. The mounting plates 3.4 may respectively comprise a center hole through which the bar 12 is guided. Furthermore, the springs 14 may be engaged to the mounting plate 3.4, wherein another end (not shown) of the spring 14 is fixed to the mounting plate 3.4 in a form-fit, force-fit and/or bonded manner.

The second swivel actuators 7, 8 are further mounted to the base platform 4 respectively via another mounting plate 4.3. The other mounting plates 4.3 are both engaged to or are formed integrally with the upper platform 4.1. The other mounting plates 4.3 may also respectively comprise a center hole through which the bars 12' are guided. Furthermore, the springs 14 may be engaged to the other mounting plates 4.3, wherein another end (not shown) of the spring 14 is fixed to the other mounting plate 4.3 in a form-fit, force-fit and/or bonded manner.

In addition to the springs 14 or optionally, a damper could be used to bias the swivel actuators 5 to 8.

FIG. 7B shows that the seat tilting system 2 comprises a number of releasing elements 16, such as levers. Referring to the first and second swivel actuators 5 to 8, a releasing element 16 is arranged at an end of each bar 12, 12'. The releasing elements 16 each comprise a center gap, through which one of the bars 12, 12' protrudes. Referring to the third swivel actuator 9, the releasing element 16 is arranged parallel to the upper platform 4.1, whereby the bar 12" is guided through a center gap of the release element 16 (not shown).

Each releasing element 16 is configured to release the corresponding swivel actuator 5 to 9, for example all swivel actuators 5 to 9 at once. Therefore, the not shown release element 16 assigned to the third swivel actuator 9 is connected to the other releasing elements 16 in order to enable a simultaneous releasing of all swivel actuators 5 to 9. For instance, a cable system and/or a linkage system 17 can be used to operate the releasing elements 16. In the shown embodiment, the releasing elements 16 are connected to a cable system 17, e.g. a Bowden cable on both sides.

The cable system 17 links the releasing elements 16 to the operating and/or releasing and locking lever 11 which is mounted to the cover side of the seat 1 and which is configured to actuate motion of the seat tilting system 2 and/or the cushion structure 3.2. If the lever 11 is operated in a predetermined direction, one of the bars 12, 12', 12" moves around the corresponding swivel axis SPA, SRA, SYA leading to a desired motion of the seat 1. The springs 14 of the corresponding swivel actuator 5 to 9 load, thereby turning the releasing element 16 around the corresponding swivel axis SPA, SRA, SYA.

A not shown locking mechanism is adapted to lock a desired position of the seat 1. The locking mechanism may be coupled to the operating and/or releasing and locking lever 11.

In order to release a locked position of the seat 1, the lever 11 is operated in another predetermined direction, leading to a turning of the corresponding releasing element 16 around the corresponding swivel axis SPA, SRA, SYA or to a turning of all releasing elements 16 at once. The releasing element 16 of the third swivel actuator 9 can be linked to the other swivel actuators 5 to 8, for instance to be released simultaneously. Operating the lever 11 to release all swivel actuators 5 to 9 can include the release of a front cushion tilt. The front cushion tilt could also be released by a separate element, such as a button or lever (not shown). The separate element can be arranged on a different location on the seat 1 and be configured as a different style of release handling.

Furthermore, the springs 14 are each covered by a spring cover 14.2, wherein only the spring cover 14.2 for the first swivel actuator 5 is shown in FIG. 7B.

FIG. 7C shows a bottom view of the seat tilting system 2, wherein only the upper platform 4.1 of the base platform 4 is shown.

It can be seen that a recliner core element 9.1 of the third swivel actuator 9 is engaged to the bottom side of the upper platform 4.1. As mentioned before, the yaw axis SYA is not spring-loaded. Hence, the recliner core element 9.1 is not engaged to a spring 14 and the adaptor plates 20.1, 20.2 do not comprise a spring tab 20.1.1 and a travel stop 19.

Figure 8A:
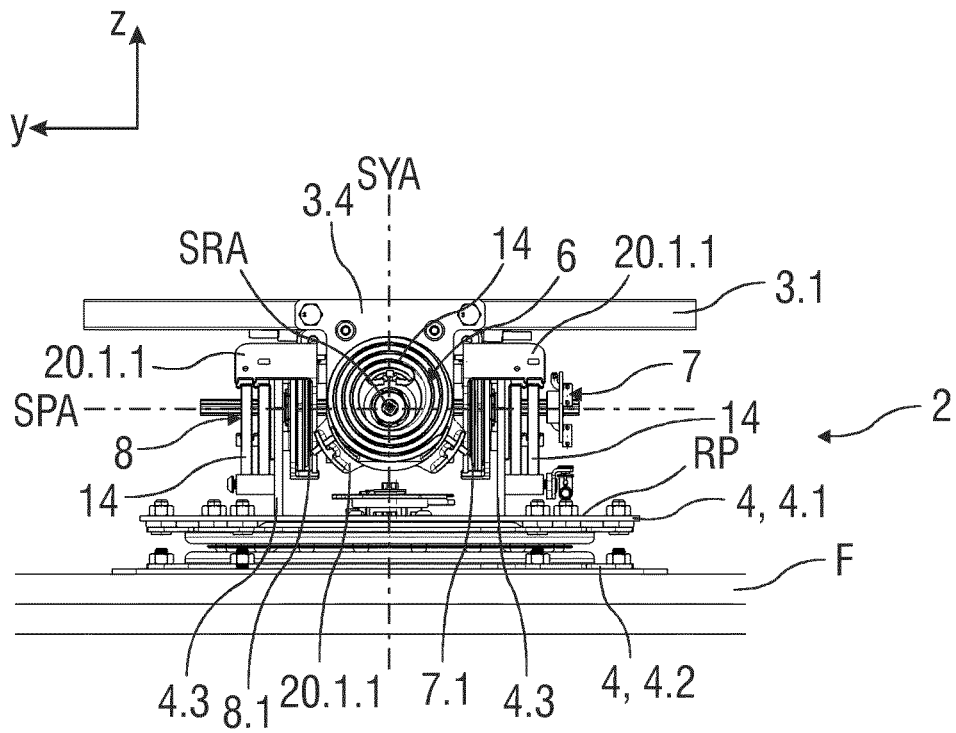
FIGS. 8A to 8F show each a side view of an embodiment of the seat tilting system in different positions.
Figure 8B:
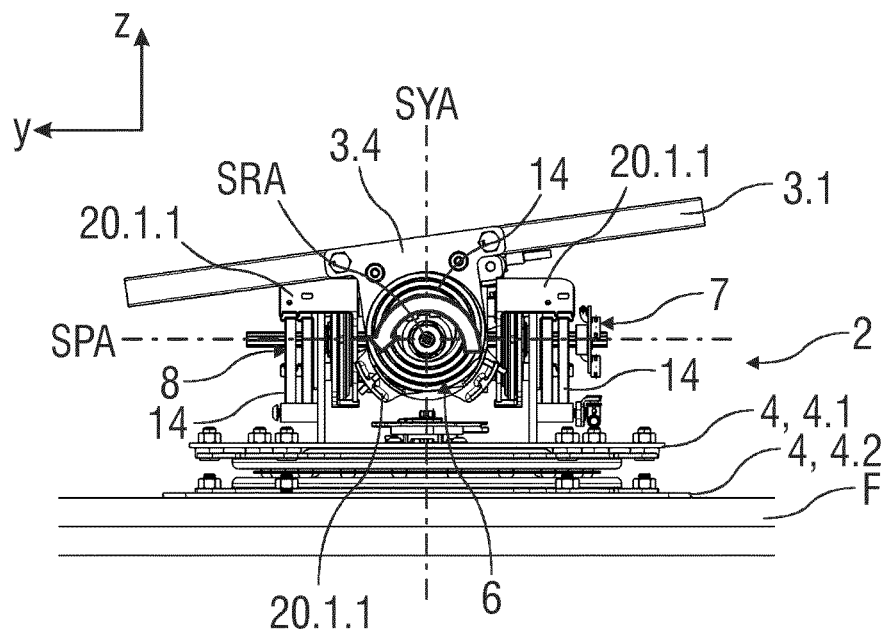
Figure 8C:
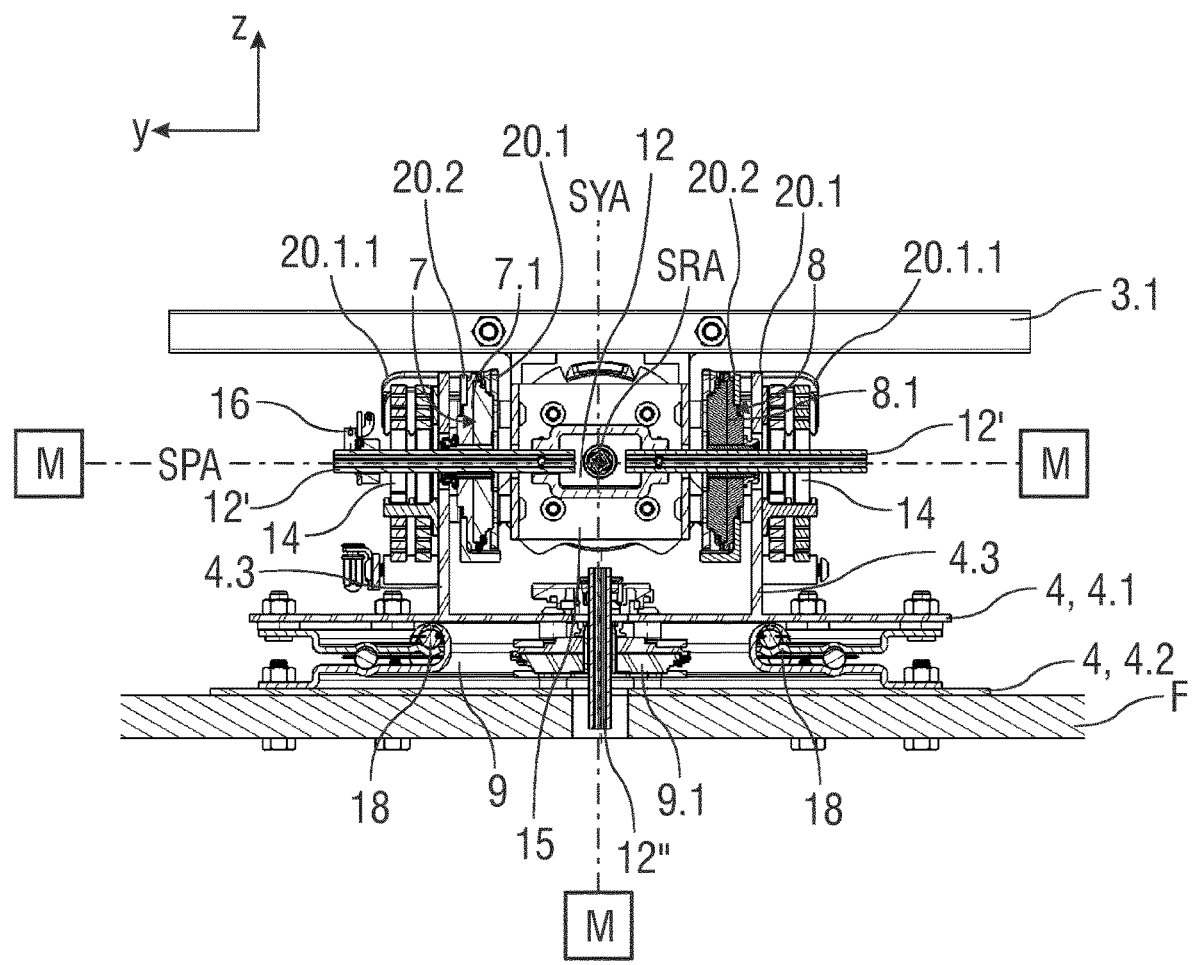

According to another embodiment, the swivel actuators 5 to 9 are coupled to at least one motor M and transmission mechanism working together at each axis to electrically move the seat 1 as it is exemplarily shown in FIG. 8C. The release of the swivel actuators 5 to 9 can also be realized via an electrical transmission mechanism. For example, a single button lever or push button can be used to release all swivel actuators 5 to 9 simultaneously. This reduces efforts, a release time and a locking time.

FIGS. 8A to 8F show each a side view of an embodiment of the seat tilting system 2 in different positions.

FIG. 8A shows a front view of the seat tilting system 2.

FIG. 8B shows a front view of the roll motion of the first, roll swivel actuators 5, 6, whereas springs 14 are used to balance the roll motion on both sides. Thereby, the occupant gets a controlled smooth feeling when adjusting the seat 1 to a desired angled position. Further, a power version of the seat tilting system 2 is configured with controlled speed, e.g. with use of a set of buttons and/or a joy stick for intuitive operating diverse motions.

FIG. 8C shows a sectional view of the set of second, pitch swivel actuators 7, 8. For instance, each of the swivel actuators 7, 8 comprises recliner core elements 7.1, 8.1 for the pitch motion. Further, the third, yaw swivel actuator 9 comprises the recliner core element 9.1.

The seat tilting system 2 further comprises a swivel bearing 18 that is arranged between the upper and lower platform 4.1, 4.2 and configured to reduce efforts to move the seat 1.

Furthermore, the swivel actuators 5 to 9 are each coupled to a motor M. In particular, the bars 12, 12', 12" each are coupled to a motor M to electrically move the seat 1.

Figure 8D:
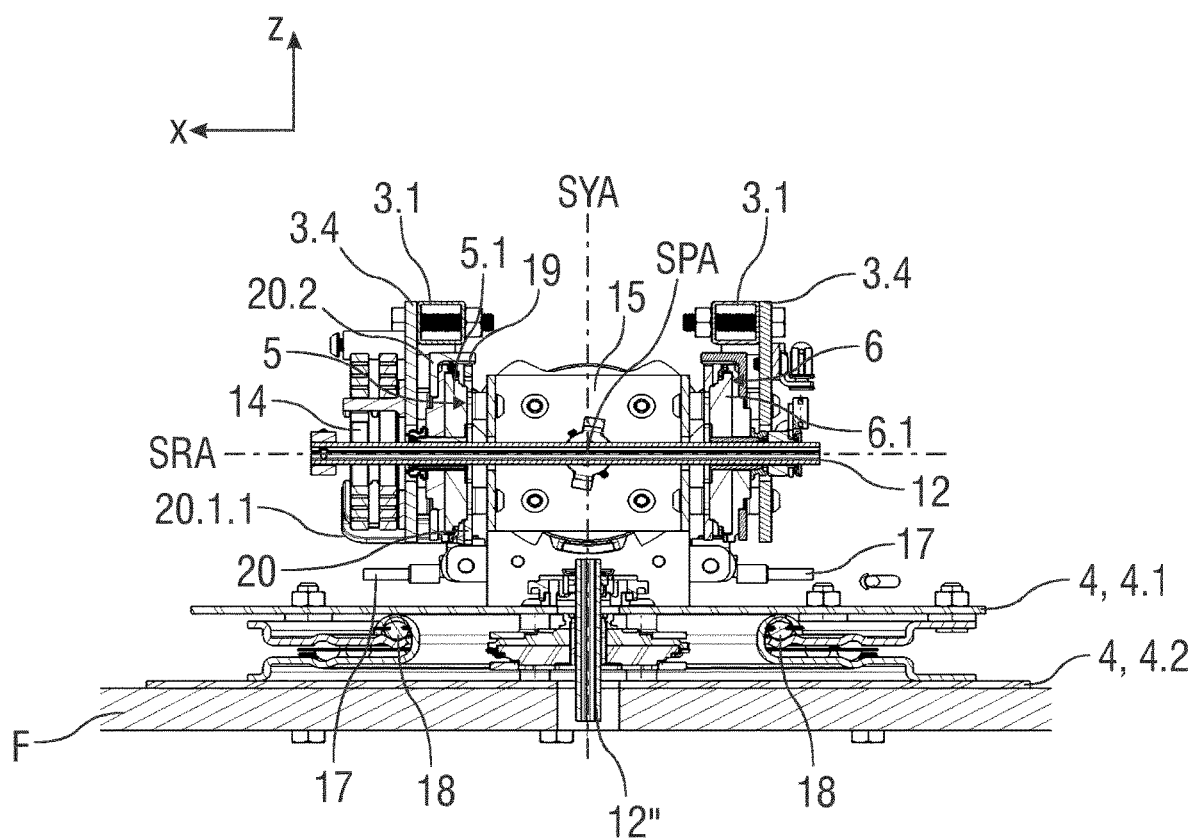

FIG. 8D shows a sectional view of the set of first, roll swivel actuators 5, 6. For instance, each of the swivel actuators 5, 6 comprises recliner core elements 5.1, 6.1 for the roll motion.

Figure 8E:
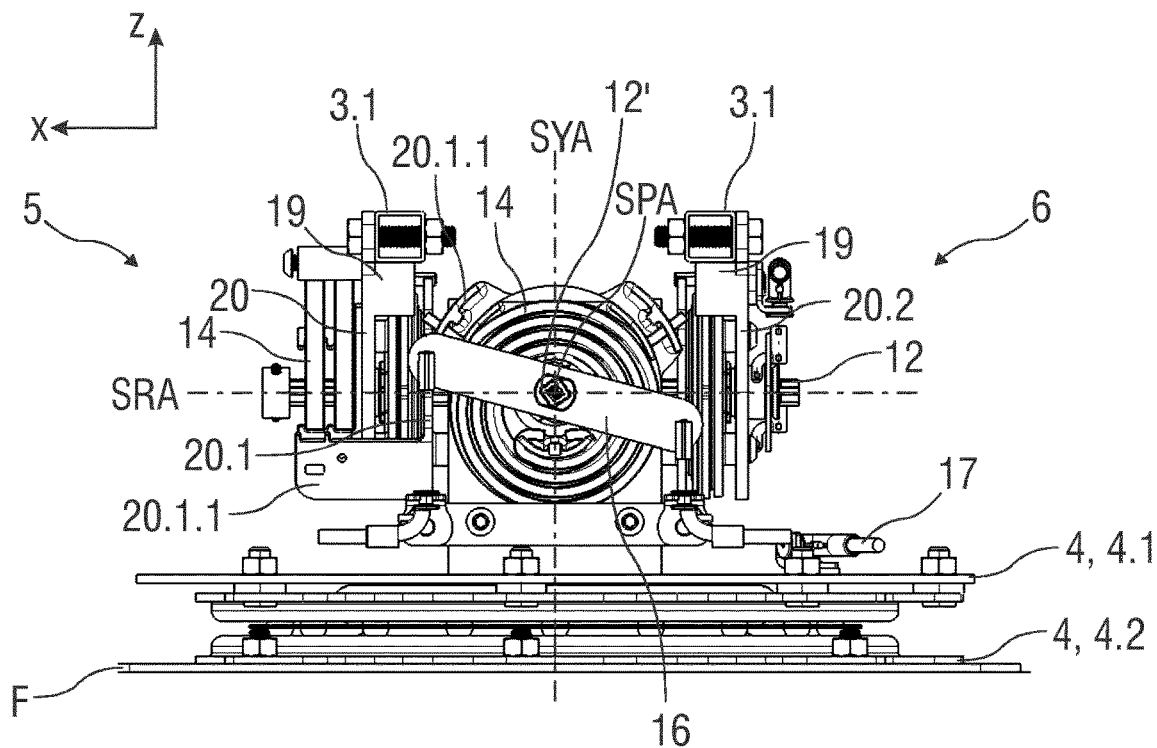
Figure 8F:
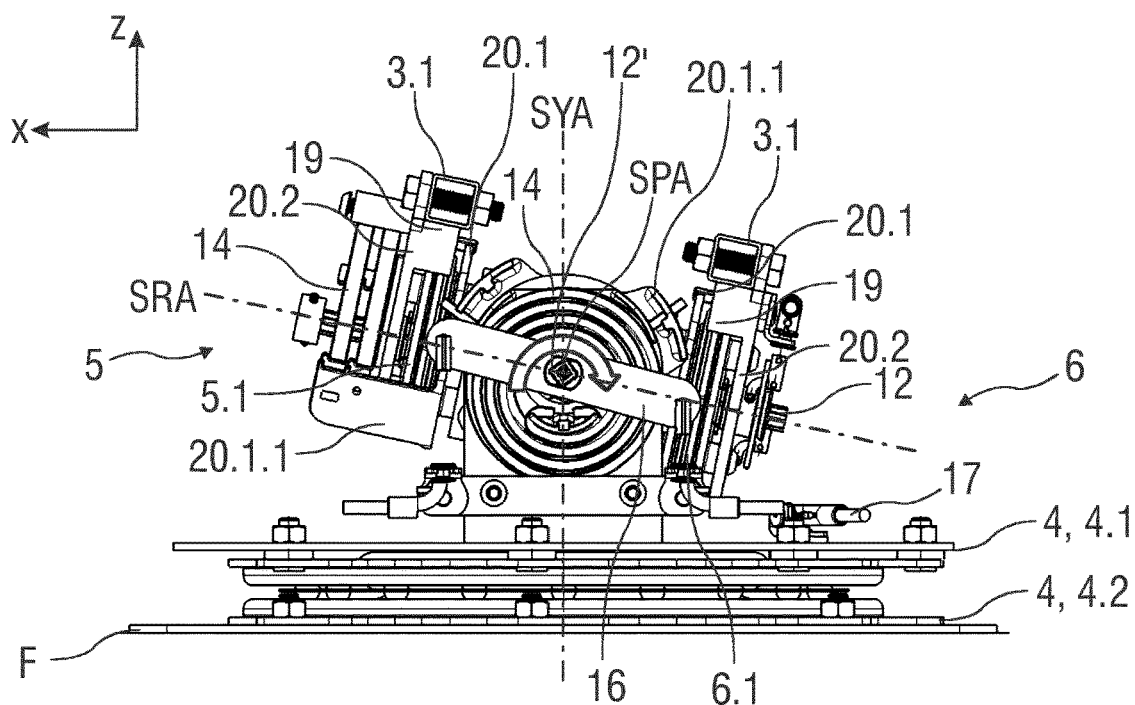

FIGS. 8E and 8F show side views of the pitch motion of the second, pitch swivel actuators 7, 8, whereas springs 14 are used to balance the pitch motion on both sides. In particular, FIGS. 8E and 8F show a pitch motion of the seat 1 around the second swivel axis SPA, i.e. the pitch axis. The seat 1 and hence the cross tubes 3.1 engaged to the first swivel actuators 5, 6 swivel sideways to the right (referring to the viewing direction) with respect to the base platform 4 and to the other swivel actuators 7 to 9.

Figure 9C:
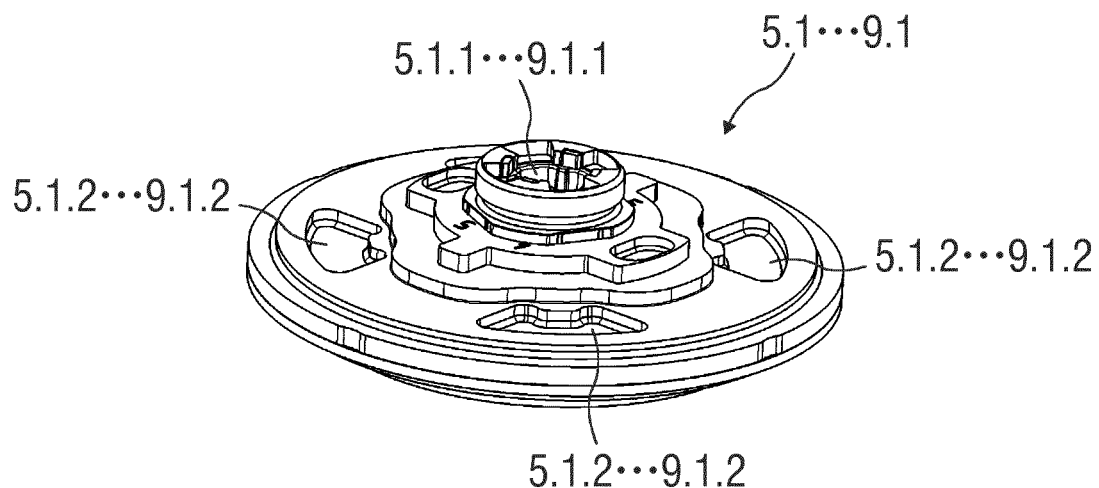

FIGS. 9A to 9C show each a perspective view of an embodiment of one of the recliner core elements 5.1 to 9.1 of one of the swivel actuators 5 to 9 of the seat tilting system 2. The shown recliner core element 5.1 to 9.1 comprises a substantially gyroscope shape. The recliner core element 5.1 to 9.1 further comprises a central hole 5.1.1 to 9.1.1 adapted to receive one of the bars 12, 12', 12" and a number of further holes 5.1.2 to 9.1.2 arranged and distributed on an outer circumference of the recliner core element 5.1 to 9.1. The further holes 5.1.2 to 9.1.2 are adapted to receive fastening elements 20.3 arranged on the adaptor plates 20.1, 20.2 and adapted to fix the swivel actuators 5 to 8 on to the adaptor 15 and to fix the swivel actuator 9 on to the upper platform 4.1.

In particular, FIGS. 9A and 9B show one of the recliner core elements 5.1 to 9.1 with a number of adaptor plates 20.1, 20.2. As described above, the adaptor plates 20.1, 20.2 are arranged and configured to attach spring tabs 20.1.1 to the springs 14 and travel stops 19 to recesses 19' in each of the corresponding swivel axis SRA, SPA, SYA. A similar setup could be used with a power recliner heart. The adaptor plates 20.1, 20.2 for the third swivel actuator 9 may not comprise spring tabs 20.1.1 and travel stops 19. FIG. 9C shows one of the recliner core elements 5.1 to 9.1 without adaptor plates 20.1, 20.2.

Figure 10:
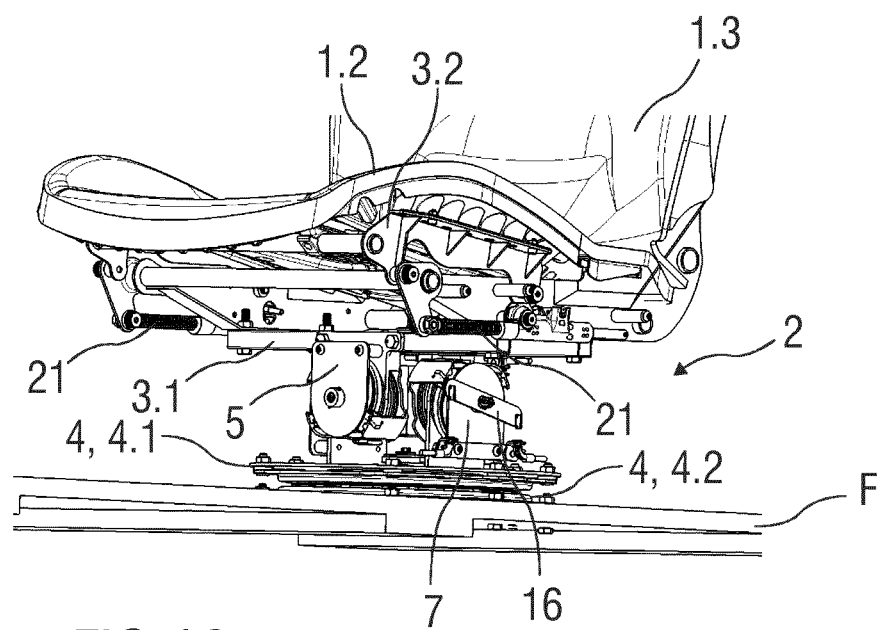
FIG. 10 shows a perspective view of an embodiment of a section of the seat and the seat tilting system without a cover.

FIG. 10 shows a perspective view of an embodiment of a section of the seat 1 and the seat tilting system 2 without the cover 10 but with a manual mechanism 21 comprising manual linear actuators 21.1, which will be described further below.

Figure 11A:
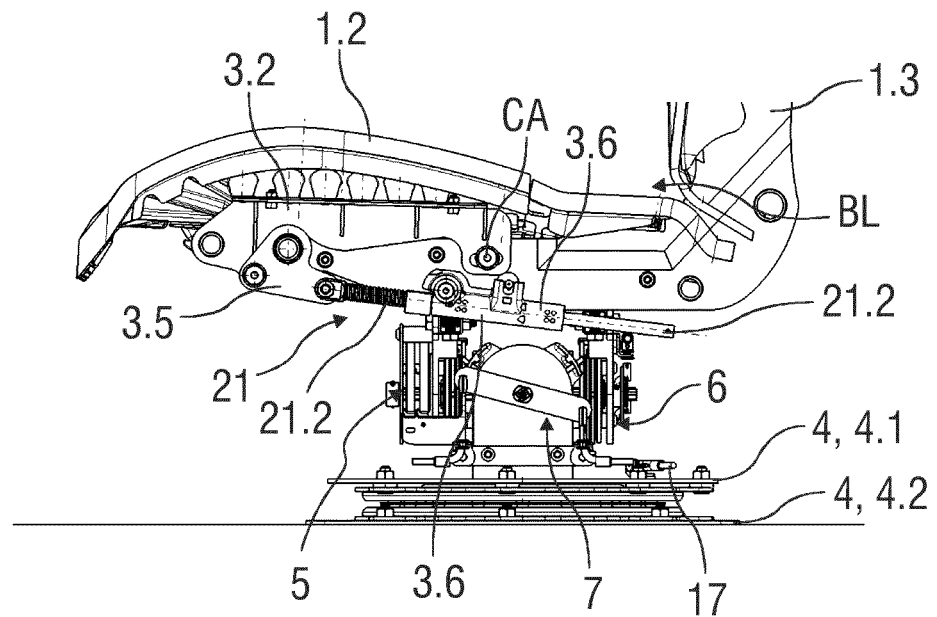
FIGS. 11A to 11C show a side view of an embodiment of a section of the seat and the seat tilting system with a seat cushion structure in different positions.
Figure 11B:
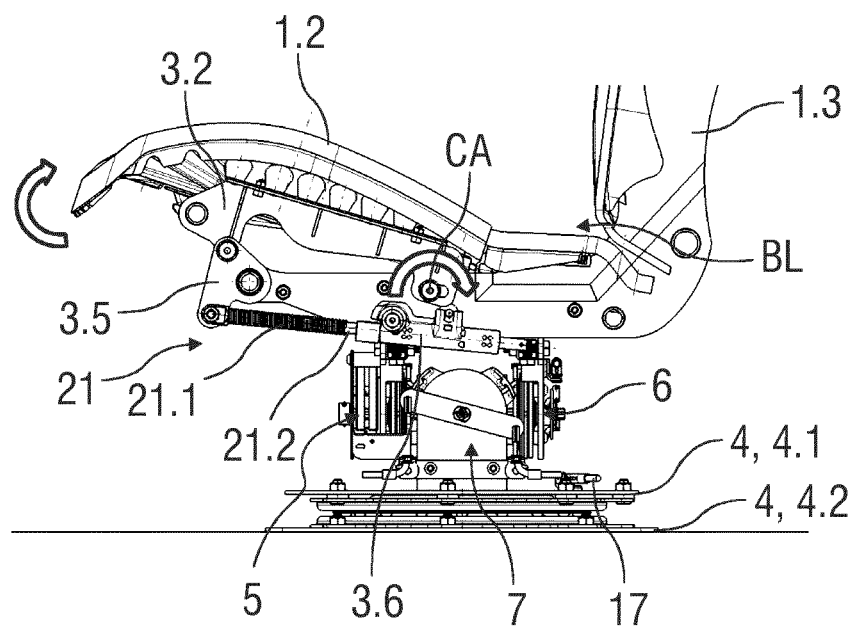
Figure 11C:
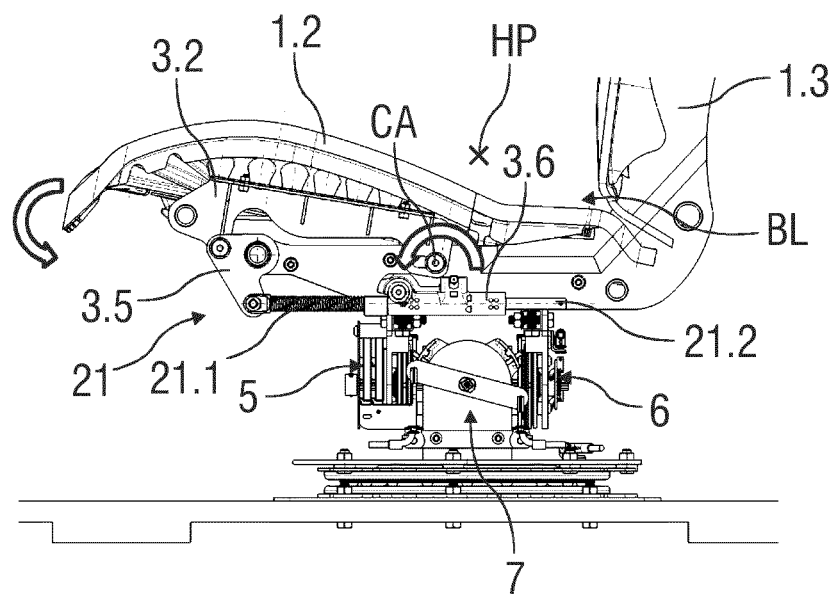

FIG. 11A to 11C show the seat 1 and the seat tilting system 2 without the cover 10 and with the seat cushion structure 3.2 in different positions. Particularly, FIG. 11A shows the cushion structure 3.2 in a first fully folded-down position. FIG. 11B shows the cushion structure 3.2 in a folded-up position and FIG. 11C shows a less folded-up, folding-down position of the cushion structure 3.2.

In particular, FIG. 10 and FIGS. 11A to 11C show the manual mechanism 21 comprising manual linear actuators 21.1 on both sides of the cushion structure 3.2. The manual mechanism 21 tilts or flexes the front of the cushion structure 3.2. Particularly, the linear actuator 21.1 may be configured as a spring actuator, e.g. a compression spring that is wounded around a spindle 21.2. The spindle 21.2 is fixed to a fitting 3.5, which is articulately jointed to the cushion structure 3.2. The spindle 21.2 is further guided through a hollow sleeve 3.6 comprising a diameter that is greater than the diameter of the spindle 21.2 but less or equal to the diameter of the linear actuator 21.1.

Hence, the manual mechanism 21 is spring-loaded so the front cushion angle follows the occupant's thigh angle by biasing the front of the cushion structure 3.2 in the upward direction due to the weight of the occupant.

Referring to FIGS. 11A and 11B, the linear actuator 21.1 is compressed when the cushion structure 3.2 is pressed down due to the weight of an occupant (FIG. 11A). The compression of the linear actuator 21.1 results from the movement of the spindle 21.2 following the movement of the fitting 3.5, which swivels counterclockwise. Consequently, the spindle 21.2 moves to the right (referring to the viewing direction) through the sleeve 3.6. The end of the sleeve 3.6 facing the linear actuator 21.1 forms a stop for the linear actuator 21.1 so the linear actuator 21.1 compresses when contacting the sleeve 3.6.

The linear actuator 21.1 releases when the cushion structure 3.2 moves in the upward direction due to a release of the occupant's weight (FIG. 11B).

A rear of the cushion structure 3.2 is static so a bite line BL of the seat 1 is maintained. Therefore, the cushions tilt and flex axis CA is arranged substantially in a center region of the seat pan 1.2. Particularly, the tilt and flex axis CA is below the occupant's H-point HP and slightly forward in a position close to natural pelvic tilt of the occupant. According to a further embodiment, the cushion structure 3.2 could also be split so each lateral side of the cushion structure 3.2 is configured to follow each of the occupant's thigh angles independently. Therefore, an independent locking mechanism and linkage system can be coupled to the cushion structure 3.2.

Figure 12:
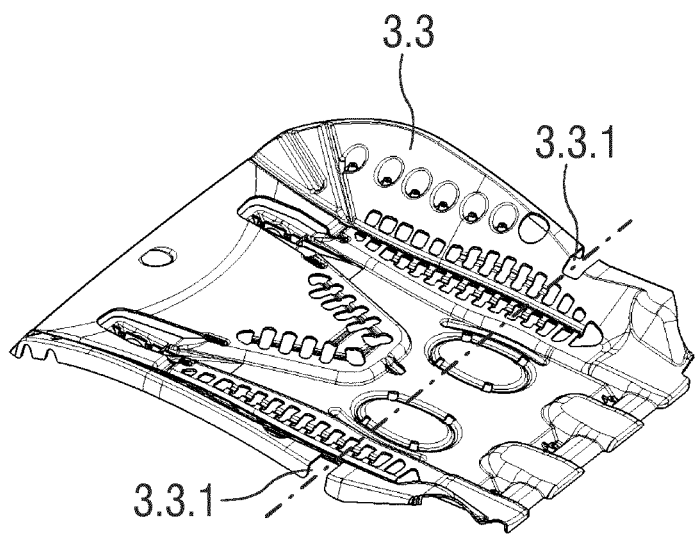
FIG. 12 shows a perspective view of an embodiment of a cushion panel of the seat cushion structure.

FIG. 12 shows a perspective view of an embodiment of a seat cushion panel 3.3 of the seat cushion structure 3.2. For instance, the cushion panel 3.3 comprises foam and/or is made of any flexible material so the front portion can flex with the front tilt motion of the cushion structure 3.2. In the shown embodiment, the cushion panel 3.3 comprises cut-outs 3.3.1 arranged on lateral sides of the cushion panel 3.3. The cut-outs 3.3.1, such as notches, are arranged to create flex points, corresponding to the tilt and flex axis CA of the cushion structure 3.2, shown in figures before.

Figure 13A:
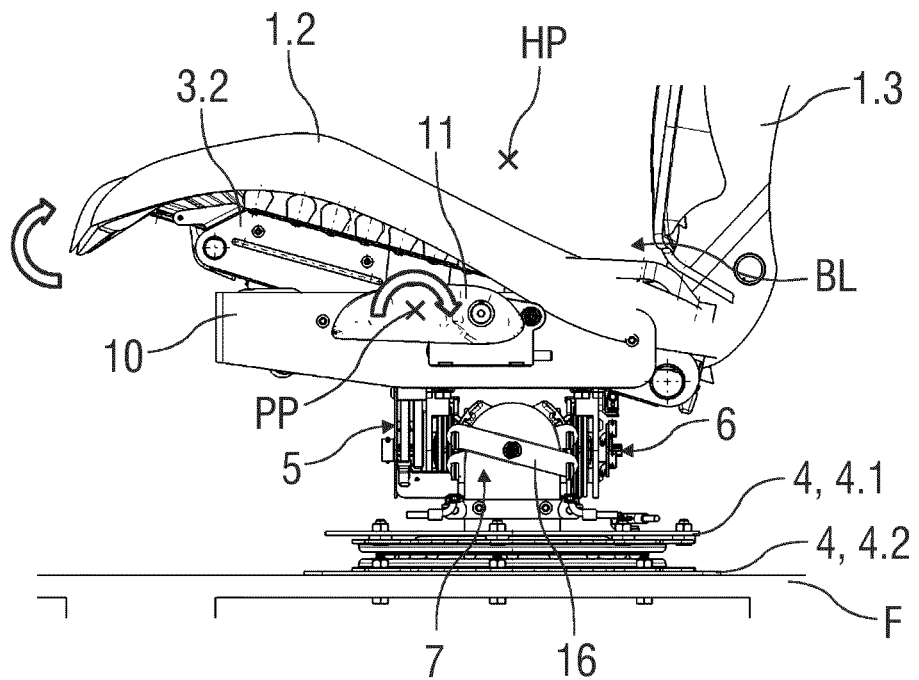
FIGS. 13A and 13B show a side view of an embodiment of the section of the seat and the seat tilting system with the seat cushion structure in different positions.
Figure 13B:
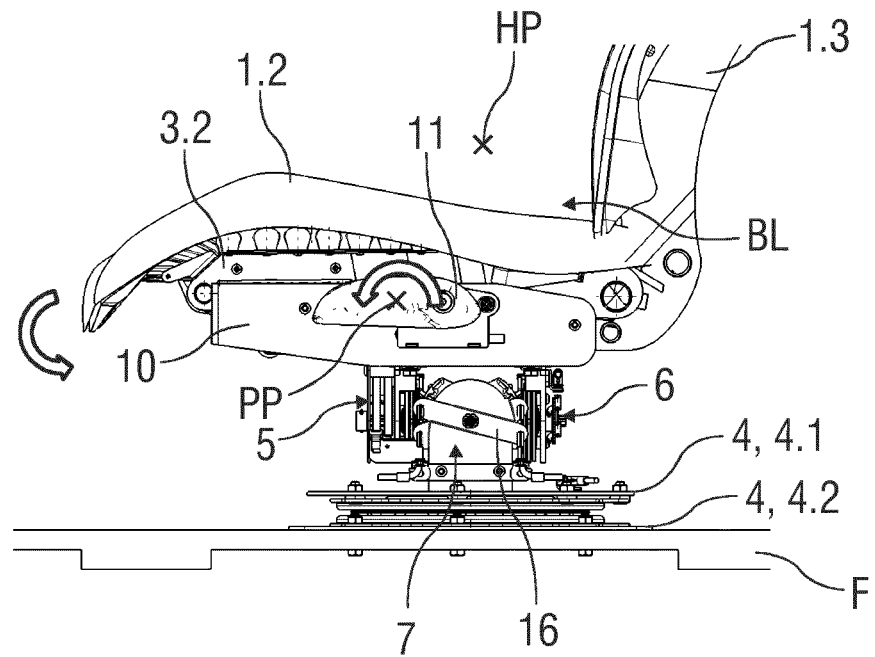

FIGS. 13A and 13B show a side view of an embodiment of the section of the seat 1 and the seat tilting system 2 with the seat cushion structure 3.2 in different positions. Particularly, FIG. 13A shows the cushion structure 3.2 in a folded-up position. FIG. 13B shows the cushion structure 3.2 in a folded-down position. In the shown embodiment, the entire cushion of the seat 1 is tiltable. For instance, the cushion structure 3.2 extends over an entire length and width of the seat pan 1.2. A pivot point PP is arranged below and slightly forward of the occupant's H-point HP in a location where the occupant can easily shift the cushion angle with his/her weight. Alternatively or optionally, the cushion structure 3.2 can be spring-loaded. By shifting the entire cushion structure 3.2, the bite line BL will be affected.

LIST OF REFERENCES 1 seat
1.1 seat structure
1.2 seat pan
1.2.1 front seat pan side
1.3 backrest
2 seat tilting system
3 seat support structure
3.1 cross tube
3.2 cushion structure
3.3 cushion panel
3.3.1 cut-out
3.4 mounting plate
3.5 fitting
3.6 sleeve
4 base platform
4.1 upper platform
4.2 lower platform
4.3 mounting plate
5 to 9 swivel actuator
5.1 to 9.1 recliner core element
5.1.1 to 9.1.1 central hole
5.1.2 to 9.1.2 further hole
10 cover
11 lever
12, 12', 12" bar
13 bar adaptor
14 spring
14.1 spring end
14.2 spring cover
15 adaptor
16 releasing element
17 cable and/or linkage system
18 bearing
19 travel stop
19' recess
20.1, 20.2 adaptor plate
20.1.1 spring tab
20.3 fastening element
21 manual mechanism
21.1 linear actuator
21.2 spindle
BL bite line
CA tilt and flex axis
CP center point
F floor
HP H-point (hip-point)
PP pivot point
RM recliner mechanism
RP reference plane
SPA swivel axis, pitch axis
SRA swivel axis, roll axis
SYA swivel axis, yaw axis
V vehicle
x longitudinal axis
y transverse axis
z vertical axis

The invention claimed is:

1. A seat tilting system for tilting a vehicle seat, comprising:
a seat support structure to support and mount the seat,
a base platform defining a reference plane, and
a number of swivel actuators coupling the seat support structure relative to the base platform, wherein
at least a first swivel actuator is configured to swivel the seat support structure with respect to the base platform around a first swivel axis,
at least a second swivel actuator is configured to swivel the seat support structure with respect to the base platform around a second swivel axis, and
at least a third swivel actuator is configured to rotate the seat support structure around a third swivel axis perpendicular to the base platform,
wherein each swivel actuator comprises at least one rotary recliner mechanism which is configured as a wobble drive mechanism arranged in a corresponding swivel axis,
wherein two first swivel actuators and two second swivel actuators are pairwise mounted on opposite sides of an adaptor,
wherein the adaptor is movable relative to the base platform and the seat support structure.

2. The seat tilting system according to claim 1, wherein each swivel actuator is arranged and configured to adjust the seat support structure in any combination of a number of degrees of freedom including yaw, pitch and roll.

3. The seat tilting system according to claim 1, wherein each swivel actuator is independently and/or simultaneously adjustable and lockable in any position.

4. The seat tilting system according to claim 1, wherein each swivel actuator is manually or power-driven adjustable.

5. The seat tilting system according to claim 1, wherein at least the first swivel actuator is pivotably coupled to the second swivel actuator such that the first swivel actuator moves with respect to the base platform when the second swivel actuator is actuated.

6. The seat tilting system according to claim 1, wherein at least the first swivel actuators and the second swivel actuators are coupled to each other via the adaptor.

7. The seat tilting system according to claim 1, wherein the swivel actuators are arranged to each other in such a manner that their swivel axes meet in a center point of the base platform.

8. The seat tilting system according claim 1, wherein the seat support structure comprises at least a cushion structure which is manually or power-driven adjustable to follow an occupant's thigh angle, wherein the cushion structure is lockable in any angled position.

9. The seat tilting system according to claim 8, wherein the cushion structure is made of a substantially flexible material.

10. The seat tilting system according to claim 8, wherein the entire cushion structure is tiltable.

11. The seat tilting system according to claim 8, wherein a rear of the cushion structure is static.

12. The seat tilting system according to claim 8, wherein the cushion structure is split in lateral sides, wherein each lateral side of the cushion structure is adapted to follow a thigh angle of each thigh of an occupant independently.

13. A vehicle seat having a seat tilting system according to claim 1.

14. The vehicle seat according to claim 13, wherein the seat is a pedestal seat.

15. The vehicle seat according to claim 13, wherein the swivel actuators are arranged below the seat.

16. The vehicle seat according to claim 13, wherein the swivel actuators are arranged to mount the seat relatively to the base platform.

17. The vehicle seat according to claim 13, wherein the seat can be shifted and locked in any combination of a yaw-pitch-roll motion within travel limits set by each corresponding swivel axis.

18. The vehicle seat according to claim 17, wherein each of the swivel actuators is lockable in any position combination of the seat.

19. The seat tilting system according to claim 1, wherein the adaptor comprises a bar that extends parallel the first swivel axis between two first swivel actuators.

20. The seat tilting system according to claim 1, wherein the adaptor comprises stub shafts whose ends extend parallel the second swivel axis and whose ends are spaced apart from one another.

21. The seat tilting system according to claim 20, wherein a bar adaptor extends parallel the second swivel axis and connects the two stub shafts.

22. The seat tilting system according to claim 20, wherein the stub shafts are connected to two second swivel actuators.

* * * * *